(12) United States Patent
Taylor et al.

(10) Patent No.: US 6,387,471 B1
(45) Date of Patent: May 14, 2002

(54) CREEP RESISTANT COMPOSITE ELASTIC MATERIAL WITH IMPROVED AESTHETICS, DIMENSIONAL STABILITY AND INHERENT LATENCY AND METHOD OF PRODUCING SAME

(75) Inventors: Jack Draper Taylor, Roswell; James Russell Fitts, Jr., Gainesville; Cedric Arnett Dunkerly, II; Oomman Painumoottil Thomas, both of Alpharetta; Jennifer Leigh Singletary, Lawrenceville, all of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/292,634

(22) Filed: Apr. 15, 1999

(51) Int. Cl.⁷ .................................................. B32B 3/06
(52) U.S. Cl. ....................... 428/152; 428/198; 428/195; 428/155; 428/156; 442/184; 442/306; 442/328
(58) Field of Search ................................ 428/198, 195, 428/152, 155, 156; 442/184, 306, 328

(56) References Cited

U.S. PATENT DOCUMENTS

| | | | |
|---|---|---|---|
| 2,206,761 A | 7/1940 | Bergstein | 93/6 |
| 2,266,761 A | 12/1941 | Jackson, Jr. et al. | 154/46 |
| 2,357,392 A | 9/1944 | Francis, Jr. et al. | 18/47.5 |
| 2,464,301 A | 3/1949 | Francis, Jr. | 154/46 |
| 2,483,405 A | 10/1949 | Francis, Jr. | 154/54 |
| 2,957,512 A | 10/1960 | Wade et al. | 154/33.05 |
| 2,957,852 A | 10/1960 | Frankenburg et al. | 260/75 |
| 3,186,893 A | 6/1965 | Mercer | 161/60 |
| 3,371,668 A | 3/1968 | Johnson | 128/290 |

(List continued on next page.)

FOREIGN PATENT DOCUMENTS

| | | | |
|---|---|---|---|
| DE | 3734963 A1 | 4/1988 | C08L/21/00 |
| EP | 0239080 A2 | 9/1987 | D01F/6/30 |
| EP | 0327402 A2 | 8/1989 | B32B/31/20 |
| EP | 0330716 A2 | 9/1989 | B29C/61/06 |
| EP | 0432763 A1 | 6/1991 | D04H/1/56 |
| EP | 0436878 A2 | 7/1991 | B32B/31/08 |
| EP | 0 548 609 A1 | 6/1993 | |
| EP | 0582569 B1 | 2/1994 | B32B/5/26 |
| EP | 0604731 A1 | 7/1994 | B32B/31/00 |
| EP | 0 343 978 B1 | 11/1994 | |
| EP | 0 693 585 A2 | 1/1996 | |
| EP | 0713546 B1 | 3/1997 | D04H/13/00 |
| EP | 0788874 A1 * | 8/1997 | B32B/5/24 |
| EP | 0814189 A1 | 12/1997 | D04H/13/00 |
| WO | 90/03464 | 4/1990 | D04H/1/56 |
| WO | 92/16371 | 10/1992 | B32B/31/00 |
| WO | 93/15247 | 8/1993 | D04H/1/48 |
| WO | 95/09261 | 4/1995 | |
| WO | 95/16562 | 6/1995 | B32B/5/24 |
| WO | 95/34264 | 12/1995 | A61F/13/15 |
| WO | 97/24482 | 7/1997 | |
| WO | 98/06290 A1 * | 2/1998 | A44B/18/00 |
| WO | 98/27257 A3 * | 6/1998 | D04H/1/00 |
| WO | 98/27257 A2 * | 6/1998 | D04H/1/00 |
| WO | 98/29251 | 7/1998 | |

*Primary Examiner*—William P. Watkins, III
(74) *Attorney, Agent, or Firm*—Steven D. Flack

(57) ABSTRACT

A method of producing a creep resistant composite elastic material wherein an elastic fibrous web is bonded to at least one gatherable layer to form a composite elastic material is provided. By passing the composite elastic material into a nip formed between an anvil calender roller and a point un-bonded calender roller, wherein the point un-bonded calender roller has recessed areas in the surface of said roller, a material which is creep resistant, dimensionally stable, and has inherent latency, is formed.

11 Claims, 8 Drawing Sheets

U.S. PATENT DOCUMENTS

| | | | |
|---|---|---|---|
| 3,391,048 A | 7/1968 | Dyer et al. ................. 161/58 |
| 3,439,085 A | 4/1969 | Hartman ..................... 264/210 |
| 3,449,187 A | 6/1969 | Bobkowicz ................. 156/161 |
| 3,468,748 A | 9/1969 | Bassett ....................... 161/122 |
| 3,575,782 A | 4/1971 | Hansen ....................... 161/141 |
| 3,616,129 A | 10/1971 | Sager ........................... 161/57 |
| 3,629,047 A | 12/1971 | Davison ....................... 161/57 |
| 3,669,823 A | 6/1972 | Wood ........................... 161/141 |
| 3,673,026 A | 6/1972 | Brown ......................... 156/164 |
| 3,676,242 A | 7/1972 | Prentice ..................... 156/62.4 |
| 3,689,342 A | 9/1972 | Vogt et al. .................. 156/167 |
| 3,752,613 A | 8/1973 | Vogt et al. .................... 425/80 |
| 3,773,590 A | 11/1973 | Morgan ....................... 156/244 |
| 3,802,817 A | 4/1974 | Matsuki et al. ............... 425/66 |
| 3,806,289 A | 4/1974 | Schwarz ....................... 425/72 |
| 3,836,416 A | 9/1974 | Ropiequet ........................ 161/2 |
| 3,849,241 A | 11/1974 | Butin et al. ................. 161/169 |
| 3,855,046 A * | 12/1974 | Hansen et al. ............. 161/150 |
| 3,873,255 A | 3/1975 | Kalwaites .................... 425/83 |
| 3,890,184 A | 6/1975 | Morgan ....................... 156/244 |
| 3,912,567 A | 10/1975 | Schwartz .................... 156/167 |
| 3,949,130 A | 4/1976 | Sabee et al. ................ 428/192 |
| 3,978,185 A | 8/1976 | Buntin et al. ................ 264/93 |
| 4,013,816 A | 3/1977 | Sabee et al. ................ 428/288 |
| 4,041,203 A | 8/1977 | Brock et al. ................ 428/157 |
| 4,090,385 A | 5/1978 | Packard ....................... 72/191 |
| 4,107,364 A | 8/1978 | Sisson ......................... 428/196 |
| 4,152,389 A | 5/1979 | Miller ......................... 264/284 |
| 4,209,563 A | 6/1980 | Sisson ......................... 428/288 |
| 4,211,807 A | 7/1980 | Yazawa et al. ............. 428/109 |
| 4,239,578 A | 12/1980 | Gore ........................... 156/361 |
| 4,259,220 A | 3/1981 | Bunnelle et al. ........ 260/27 BB |
| 4,302,495 A | 11/1981 | Marra ......................... 428/110 |
| 4,303,571 A | 12/1981 | Jansen et al. ............. 260/33.6 |
| 4,304,234 A | 12/1981 | Hartmann .................. 128/287 |
| 4,310,594 A | 1/1982 | Yamazaki et al. .......... 428/296 |
| 4,323,534 A | 4/1982 | DesMarais .................. 264/176 |
| 4,333,782 A | 6/1982 | Pieniak ....................... 156/164 |
| 4,342,314 A | 8/1982 | Radel et al. ................ 128/287 |
| 4,371,417 A | 2/1983 | Frick et al. ................ 156/495 |
| 4,375,446 A | 3/1983 | Fujii et al. ................ 264/518 |
| 4,405,397 A | 9/1983 | Teed ........................... 156/164 |
| 4,413,623 A | 11/1983 | Pieniak ....................... 604/365 |
| 4,417,935 A | 11/1983 | Spencer ....................... 156/80 |
| 4,418,123 A | 11/1983 | Bunnelle et al. ............ 428/517 |
| 4,432,823 A | 2/1984 | Moore ......................... 156/164 |
| 4,440,819 A | 4/1984 | Rosser et al. ............... 428/107 |
| 4,463,045 A | 7/1984 | Ahr et al. .................... 428/131 |
| 4,490,427 A | 12/1984 | Grant et al. ................ 428/107 |
| 4,496,417 A | 1/1985 | Haake et al. ................ 156/361 |
| 4,507,163 A | 3/1985 | Menard ....................... 156/164 |
| 4,518,451 A | 5/1985 | Luceri et al. ................ 156/202 |
| 4,525,407 A * | 6/1985 | Ness ........................... 428/138 |
| 4,543,099 A | 9/1985 | Bunnelle et al. ............ 604/385 |
| 4,546,029 A | 10/1985 | Cancio et al. ............... 428/141 |
| 4,548,859 A | 10/1985 | Kline et al. ................ 428/251 |
| 4,552,795 A | 11/1985 | Hansen et al. ............. 428/110 |
| 4,555,811 A | 12/1985 | Shimalla ......................... 2/51 |
| 4,572,752 A | 2/1986 | Jensen et al. ............... 156/64 |
| 4,606,964 A * | 8/1986 | Wideman .................... 428/152 |
| 4,626,305 A | 12/1986 | Suzuki et al. ............... 156/164 |
| 4,640,859 A | 2/1987 | Hansen et al. ............. 428/105 |
| 4,652,487 A | 3/1987 | Morman ....................... 428/137 |
| 4,656,081 A | 4/1987 | Ando et al. ................ 428/233 |
| 4,657,802 A | 4/1987 | Morman ....................... 428/152 |
| 4,663,220 A | 5/1987 | Wisneski et al. ............ 428/221 |
| 4,666,542 A | 5/1987 | De Jonckheere ............ 156/164 |
| 4,675,068 A | 6/1987 | Lundmark ................... 156/495 |
| 4,683,877 A | 8/1987 | Ersfeld et al. ................ 128/90 |
| 4,687,477 A | 8/1987 | Suzuki et al. ............... 604/385 |
| 4,692,368 A | 9/1987 | Taylor et al. ................ 428/137 |
| 4,692,371 A | 9/1987 | Morman et al. ............ 428/224 |
| 4,719,261 A | 1/1988 | Bunnelle et al. ............. 525/97 |
| 4,720,415 A | 1/1988 | Vander Wielen et al. ... 428/152 |
| 4,734,311 A | 3/1988 | Sokolowski ................ 428/152 |
| 4,735,673 A | 4/1988 | Piron ........................... 156/496 |
| 4,756,942 A | 7/1988 | Aichele ....................... 428/102 |
| 4,761,198 A | 8/1988 | Salerno ....................... 156/334 |
| 4,761,322 A | 8/1988 | Raley ........................... 428/198 |
| 4,762,582 A | 8/1988 | De Jonckhere ............. 156/164 |
| 4,774,124 A | 9/1988 | Shimalla et al. ............ 428/171 |
| 4,775,579 A | 10/1988 | Hagy et al. .................. 428/284 |
| 4,777,080 A | 10/1988 | Harris, Jr. et al. .......... 428/212 |
| 4,789,699 A | 12/1988 | Kieffer et al. ............... 524/271 |
| 4,794,680 A | 1/1989 | Meyerhoff et al. ............ 29/132 |
| 4,801,345 A | 1/1989 | Dussaud et al. ............. 156/164 |
| 4,801,482 A | 1/1989 | Goggans et al. ............. 428/68 |
| 4,803,117 A | 2/1989 | Daponte ....................... 428/228 |
| 4,804,577 A | 2/1989 | Hazelton et al. ............ 428/224 |
| 4,826,415 A | 5/1989 | Mende ......................... 425/722 |
| 4,842,666 A | 6/1989 | Werenicz ..................... 156/161 |
| 4,854,985 A | 8/1989 | Soderlund et al. ............ 156/85 |
| 4,863,779 A | 9/1989 | Daponte ....................... 428/152 |
| 4,874,447 A | 10/1989 | Hazelton et al. ............ 156/167 |
| 4,883,549 A | 11/1989 | Frost et al. ................. 156/161 |
| 4,891,258 A | 1/1990 | Fahrenkrug ................. 428/138 |
| 4,892,903 A | 1/1990 | Himes ......................... 524/488 |
| 4,900,619 A | 2/1990 | Ostrowski et al. .......... 428/284 |
| 4,906,507 A | 3/1990 | Grynaeus et al. ............ 428/113 |
| 4,908,247 A | 3/1990 | Baird et al. ................. 428/34.9 |
| 4,910,064 A | 3/1990 | Sabee ......................... 428/113 |
| 4,917,746 A | 4/1990 | Kons et al. .................. 156/164 |
| 4,929,492 A | 5/1990 | Carey, Jr. et al. ........... 428/198 |
| 4,938,821 A | 7/1990 | Soderlund et al. ............ 156/85 |
| 4,968,313 A | 11/1990 | Sabee ....................... 604/385.2 |
| 4,970,259 A | 11/1990 | Mitchell et al. ............. 524/505 |
| 4,977,011 A | 12/1990 | Smith ......................... 428/152 |
| 4,981,747 A | 1/1991 | Morman ....................... 428/198 |
| 4,984,584 A | 1/1991 | Hansen et al. ............. 128/898 |
| 4,995,928 A | 2/1991 | Sabee ......................... 156/164 |
| 5,000,806 A | 3/1991 | Merkatoris et al. .......... 156/161 |
| 5,002,815 A | 3/1991 | Yamanaka et al. ........... 428/109 |
| 5,060,349 A | 10/1991 | Walton et al. ................. 26/18.6 |
| 5,073,436 A | 12/1991 | Antonacci et al. ........... 428/219 |
| 5,093,422 A | 3/1992 | Himes ......................... 525/98 |
| 5,100,435 A | 3/1992 | Onwumere ................. 8/115.55 |
| 5,143,774 A | 9/1992 | Cancio et al. ............... 428/169 |
| 5,147,487 A | 9/1992 | Normura et al. ............. 156/164 |
| 4,842,666 C1 | 11/1992 | Werenicz ..................... 156/161 |
| 5,169,706 A | 12/1992 | Collier, IV et al. ........... 428/152 |
| 5,169,712 A | 12/1992 | Tapp ......................... 428/315.5 |
| 5,188,885 A | 2/1993 | Timmons et al. ............ 428/198 |
| 5,198,281 A | 3/1993 | Muzzy et al. ................ 428/102 |
| 5,200,246 A | 4/1993 | Sabee ......................... 428/109 |
| 5,209,801 A | 5/1993 | Smith ......................... 156/161 |
| 5,219,633 A | 6/1993 | Sabee ......................... 428/109 |
| 5,226,992 A | 7/1993 | Morman ....................... 156/62.4 |
| 5,229,186 A | 7/1993 | Tribble et al. ............... 428/156 |
| 5,229,191 A | 7/1993 | Austin ......................... 428/198 |
| 5,232,777 A | 8/1993 | Sipinen et al. ............... 428/364 |
| 5,236,770 A | 8/1993 | Assent et al. ............... 428/198 |
| 5,246,762 A | 9/1993 | Nakamura .................... 428/172 |
| 5,256,231 A | 10/1993 | Gorman et al. ............. 156/178 |
| 5,259,902 A | 11/1993 | Muckenfuhs ................ 156/164 |
| 5,260,126 A | 11/1993 | Collier, IV et al. .......... 428/288 |
| 5,275,676 A | 1/1994 | Rooyakkers et al. ......... 156/164 |
| 5,284,540 A | 2/1994 | Roth et al. ................... 156/160 |
| 5,288,791 A | 2/1994 | Collier, IV et al. .......... 524/505 |
| 5,296,080 A | 3/1994 | Merkatoris et al. ......... 156/496 |
| 5,296,289 A * | 3/1994 | Collins ....................... 428/296 |
| 5,304,599 A | 4/1994 | Himes ......................... 525/98 |

| | | | |
|---|---|---|---|
| 5,308,345 A | 5/1994 | Herrin | 604/385.2 |
| 5,312,500 A | 5/1994 | Kurihara et al. | 156/62.4 |
| 5,324,580 A | 6/1994 | Allan et al. | 428/284 |
| 5,332,613 A | 7/1994 | Taylor et al. | 428/152 |
| 5,334,437 A | 8/1994 | Zafiroglu | 428/219 |
| 5,334,446 A | 8/1994 | Quantrille et al. | 428/284 |
| 5,336,545 A * | 8/1994 | Morman | 428/252 |
| 5,342,469 A | 8/1994 | Bodford et al. | 156/244.22 |
| 5,360,854 A | 11/1994 | Bozich, Jr. | 524/274 |
| 5,366,793 A | 11/1994 | Fitts, Jr. et al. | 428/198 |
| 5,376,198 A | 12/1994 | Fahrenkrug et al. | 156/164 |
| 5,385,775 A * | 1/1995 | Wright | 428/284 |
| 5,389,173 A | 2/1995 | Merkatoris et al. | 156/164 |
| 5,393,599 A | 2/1995 | Quantrille et al. | 428/284 |
| 5,399,174 A | 3/1995 | Yeo et al. | 604/365 |
| 5,405,682 A | 4/1995 | Shawyer et al. | 428/221 |
| 5,407,439 A | 4/1995 | Goulait | 604/391 |
| 5,407,507 A | 4/1995 | Ball | 156/163 |
| 5,411,618 A | 5/1995 | Jocewicz, Jr. | 156/164 |
| 5,413,654 A | 5/1995 | Igaue et al. | 156/161 |
| 5,413,849 A | 5/1995 | Austin et al. | 428/293 |
| 5,415,925 A | 5/1995 | Austin et al. | 428/287 |
| 5,422,172 A | 6/1995 | Wu | 428/230 |
| 5,425,987 A | 6/1995 | Shawver et al. | 428/284 |
| 5,429,694 A | 7/1995 | Herrmann | 156/164 |
| 5,431,644 A | 7/1995 | Sipinen et al. | 604/385.2 |
| 5,431,991 A | 7/1995 | Quantrille et al. | 428/109 |
| 5,472,775 A | 12/1995 | Obijeski et al. | 428/220 |
| 5,482,765 A | 1/1996 | Bradley et al. | 428/286 |
| 5,484,645 A | 1/1996 | Lickfield et al. | 428/198 |
| 5,498,468 A | 3/1996 | Blaney | 428/198 |
| 5,500,075 A | 3/1996 | Herrmann | 156/494 |
| 5,514,470 A | 5/1996 | Haffner et al. | 428/246 |
| 5,523,146 A | 6/1996 | Bodford et al. | 428/198 |
| 5,525,175 A | 6/1996 | Blenke et al. | 156/161 |
| 5,531,850 A | 7/1996 | Herrmann | 156/161 |
| 5,534,330 A | 7/1996 | Groshens | 428/198 |
| 5,536,555 A * | 7/1996 | Zelazoski et al. | 428/138 |
| 5,540,796 A | 7/1996 | Fries | 156/164 |
| 5,540,976 A | 7/1996 | Shawver et al. | 428/198 |
| 5,545,285 A | 8/1996 | Johnson | 156/496 |
| 5,549,964 A | 8/1996 | Shohji et al. | 428/224 |
| 5,576,090 A | 11/1996 | Suzuki | 428/152 |
| 5,599,420 A | 2/1997 | Yeo et al. | 156/290 |
| 5,628,856 A | 5/1997 | Dobrin et al. | 156/244.18 |
| 5,635,290 A * | 6/1997 | Stopper et al. | 428/198 |
| 5,645,672 A | 7/1997 | Dobrin | 156/244.18 |
| 5,650,214 A * | 7/1997 | Anderson et al. | 428/152 |
| 5,652,041 A | 7/1997 | Buerger et al. | 428/198 |
| 5,660,664 A | 8/1997 | Herrmann | 156/161 |
| 5,681,302 A | 10/1997 | Melbye et al. | 604/373 |
| 5,681,645 A * | 10/1997 | Strack et al. | 428/196 |
| 5,683,787 A | 11/1997 | Boich et al. | 428/198 |
| 5,695,376 A | 12/1997 | Datta et al. | 442/334 |
| 5,695,849 A | 12/1997 | Shawver et al. | 428/131 |
| 5,709,921 A | 1/1998 | Shawver | 428/152 |
| 5,733,635 A | 3/1998 | Terakawa et al. | 428/198 |
| 5,733,822 A | 3/1998 | Gessner et al. | 442/35 |
| 5,736,219 A | 4/1998 | Suehr et al. | 428/113 |
| 5,766,737 A | 6/1998 | Willey et al. | 428/198 |
| 5,769,993 A * | 6/1998 | Baldauf | 156/164 |
| 5,773,373 A | 6/1998 | Wynne et al. | 442/260 |
| 5,773,374 A | 6/1998 | Wood et al. | 442/328 |
| 5,789,065 A | 8/1998 | Haffner et al. | 428/152 |
| 5,853,628 A | 12/1998 | Varona | 264/6 |
| 5,858,515 A | 1/1999 | Stokes et al. | 428/195 |

* cited by examiner

CREEP RESISTANT COMPOSITE ELASTIC MATERIAL WITH IMPROVED AESTHETICS, DIMENSIONAL STABILITY AND INHERENT LATENCY AND METHOD OF PRODUCING SAME

FIELD OF THE INVENTION

The present invention is directed to a process for making a composite elastic material and articles formed therefrom, having creep resistance, improved aesthetics, dimensional stability and inherent latency. The material is formed from an elastic fibrous web which is joined with at least one gatherable layer using the nip between an anvil calender roller and a point un-bonded calender roller having recessed areas on its surface.

BACKGROUND OF THE INVENTION

Composite elastic materials and laminates thereof are known in the art as are methods for compression embossing fibrous webs. Composite elastic materials are gaining popularity for use especially in the areas of absorbent articles and disposable items because of the flexibility and conformability such materials provide the articles. The term "composite elastic material" means a multicomponent or multilayer elastic material in which at least layer has an elastic component. As used herein, the term "laminate" means a composite material made from two or more layers or webs of material which have been attached or bonded to one another. The term "absorbent articles" refers to devices which absorb and contain body exudates and, more specifically, refers to devices that are placed against or in proximity to the body of the wearer to absorb and contain the various exudates discharged from the body, and is intended to include diapers, training pants, absorbent underpants, incontinence products, medical applications such as surgical drapes, gowns and facemasks, articles of clothing or portions thereof including workwear and lab coats, and the like. Specific examples of such uses include, for instance, waistbands of diapers and training pants, side panels of training pants, and cuffs of surgical gowns. The term "disposable" is used herein to describe absorbent articles not intended to be laundered or otherwise restored or reused as an absorbent article.

Research in this area tends to be focused on utilizing elastic materials in such absorbent articles to achieve a better fit for the wearer (more conformability to the user's body), while continually searching for ways to improve the overall appearance and physical properties of the article. It is generally accepted by those in the field, that although elastic materials provide articles with better conformability, such articles generally do not have an attractive appearance or feel. The ultimate goal for such disposable items is to achieve a "cloth-like" appearance and feel, without compromising physical properties such as strength, elongation, and the like.

Another important property, known especially by those having skill in elastics, is a property known as inherent latency. As used herein, the term "inherent latency" means the internal elasticity of a material, which is dormant until the material has been subjected to an activation process, for example, to elevated temperatures, as for instance, the temperature of the body of a wearer of the article. Furthermore, the process of converting these materials into such items as diapers, is usually conducted at elevated temperatures. Shrinkage of the material, due to the activation of the inherent latency, causes production problems as well. To quantify inherent latency, a test has been described in more detail below wherein percent shrinkage has been measured at an elevated temperature over a given period of time. When the temperature increases, e.g. to body temperature, the inherent latency is activated to improve the fit and conformability of the article. Controlling inherent latency has proved complex, however, because too much inherent latency may create too much elasticity, which may, for instance, cause over-tightening, resulting in "red marking" or irritation to the skin of the wearer. As an example, an article such as a diaper, having an appropriate amount of inherent latency, will neither tend to sag or droop while being worn (and subsequently saturated with body wastes), nor will it cause red marking. (As will be understood by those skilled in the art, there are many properties which contribute to red marking, such as adjustment of the basis weight of the material. For purposes of the present invention, the inherent latency is the property controlled to improve the materials). Such sagging or drooping is a result of too little inherent latency and has typically been quantified as stress relaxation and creep. The term "stress relaxation" is defined as the decreasing load required to hold a constant elongation over a period of time. The term "creep" is defined as the loss of shape or dimension of an article due to some reversible and/or irreversible flow or structural breakdown under a constant load or force. There are two kinds of creep: (1) the time-dependent component, in which the shape changes because of the irreversible flow or structural breakdown under a constant load or force and does not recover when the force is removed; and (2) the time-independent component, wherein some of the shape recovers when the force is removed. Of course, one skilled in the art would understand that reversible loss of shape or dimension may also occur. Such is the case for materials having properties similar to a metal spring, in which case the deformation is totally reversible. As used herein, "creep resistant" means that the material resists the tendency to creep, through for instance, chemical structure, physical structure, and the like.

To make such composite materials, at least one layer of a fibrous web is laminated to at least one facing layer. Lamination may occur, for instance, by passing the layers through the nip between two rolls, one roll being a calender roll, and the other roll being an anvil roll, to compression bond and laminate the layers together. The calender and/or anvil rolls have traditionally been patterned in some way, otherwise known as point bonding, so that the resulting laminate material was not bonded across its entire surface. As a specific example, a fibrous web of an elastic continuous filament and meltblown fiber has been point bonded to a facing layer while the continuous filament web was in a stretched state as described in commonly assigned European Patent Application 0 548 609 A1 to Wright. Upon release of the tension, the laminate would retract, thereby "gathering up" the facing layer. The two-fold advantage of this was that 1) a more "cloth-like" appearance resulted, and 2) the inelastic layer could return to its pre-gathered dimension, thereby capitalizing on the elasticity of the continuous filament web.

One disadvantage of this method of lamination, though, was that the patterned (e.g. Ramisch) rolls used in point bonding can damage the elastic filaments as can be seen, for instance, in FIG. 4. FIG. 4 is a scanning electron micrograph of an elastomeric continuous filament layer 118 which has been attached to an elastomeric meltblown fiber layer 126 and bonded using patterned rolls. Several of the continuous filament strands have been torn, nicked, cut and the like as exemplified by 118'. Such damage affects the elastic properties and, thus, the performance of the material and laminates thereof by causing the fibers to completely break during use, at body temperature, and under stretched conditions as can be seen in FIG. 5. FIG. 5 is a scanning electron micrograph of the material of FIG. 4 after being subjected to use conditions. If the filament is broken, then the inherent latency of that particular filament will have little or no affect on the material and thus will not contribute to the product conformability to the body.

Commonly assigned PCT publication number WO 98/29251 to Thomas et al., describes a means of solving this problem by utilizing two smooth calender rolls to bond the layers together. Smooth roll calendering resulted in improved dimensional stability (e.g., less stress relaxation and creep) because the continuous filaments were not broken during calendering as can be seen in FIG. 6. In FIG. 6, a material as described above for FIG. 4, has been bonded this time with the smooth calender rolls. The laminate exhibited improved inherent latency by not damaging the elastomeric continuous filaments. A disadvantage of this method was that the resulting material lost its loftiness (i.e., it was flat), thus having little or no "cloth-like" aesthetics. In FIG. 7, on the right side of the photo, a similarly made material has been smooth roll calendered as compared to the material on the left side of the photo, in which the material was patterned roll calendered The material made using smooth roll calendering is clearly less lofty, and therefore less attractive to the consumer.

A need, therefore, exists for a method of manufacturing a composite elastic material that is dimensionally stable by controlling inherent latency and also has "cloth-like" aesthetics. Additionally, there is a need for a method of manufacturing a composite elastic material without damaging the fibrous layers during the manufacturing process. The present invention avoids these and other difficulties by providing such a process and articles formed therefrom.

SUMMARY OF THE INVENTION

The present invention provides a method of producing a creep resistant composite elastic material wherein an elastic fibrous web is bonded to at least one gatherable layer to form a composite elastic material. By passing the composite elastic material into a nip formed between an anvil calender roller and a point un-bonded calender roller, wherein the point un-bonded calender roller has recessed areas in the surface of said roller, a material which is creep resistant, dimensionally stable, and has inherent latency, is formed.

BRIEF DESCRIPTION OF THE DRAWINGS

As used herein, like reference numerals represent the same or similar elements in each of the figures.

DETAILED DESCRIPTION OF THE INVENTION

Figure 1:
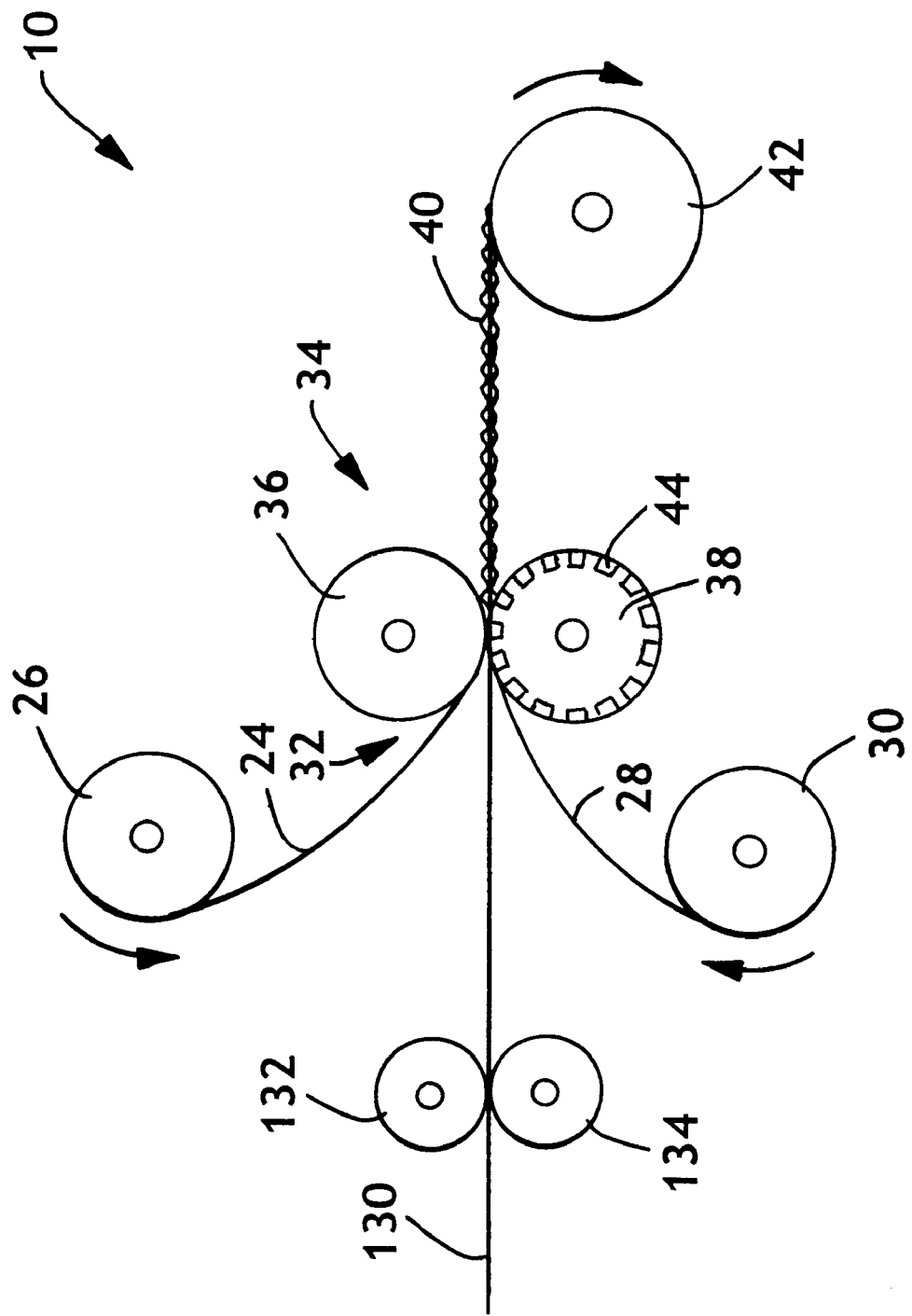
FIG. 1 is a schematic drawing of an exemplary process for forming the composite elastic material of the present invention.

The present invention provides a process for making an improved composite elastic material. This composite elastic material includes at least one layer of an elastic fibrous web and at least one gatherable layer.

Examples of such elastic fibrous webs may include at least one of a nonwoven web layer formed from a meltblowing process (as described in detail below), spunbonding process, and bonded carded web process. Suitable elastic fibrous webs may also include at least one layer of continuous, generally parallel filaments (as discussed in more detail below), film, knitted and/or woven material, scrim, netting and combinations of any of the foregoing. As used herein, the term "scrim" means a lightweight fabric used as a backing material. Scrims are often used as the base fabric for coated or laminated products. As a preferred embodiment, the elastic fibrous web will include at least one continuous filament layer and at least one meltblown layer.

As used herein, the term "nonwoven fabric or web" means a web having a structure of individual fibers or threads which are interlaid, but not in an identifiable manner as in a knitted fabric. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns ($\mu$m), more particularly, between about 10 and 20 microns ($\mu$m).

The term "elastic" is used herein to mean any material which, upon application of a biasing force, is stretchable, that is, elongatable at least about 60 percent (i.e., to a stretched, biased length which is at least about 160 percent of its relaxed unbiased length), and which, will recover at least 55 percent of its elongation upon release of the stretching, elongating force. Another way of characterizing this is known by those skilled in the art as the extension ratio ($\alpha$ or $\lambda$) which is defined as L (biased length)/$L_{()}$ (unbiased length). For the equivalent of the above discussion, the extension ratio would be 1.6. A hypothetical example would be a one (1) inch (2.54 cm) sample of a material which is elongatable to at least 1.60 inches (4.06 cm) and which, upon being elongated to 1.60 inches (4.06 cm) and released, will recover to a length of not more than 1.27 inches (3.23 cm). Many elastic materials may be elongated by much more than 60 percent (i.e., much more than 160 percent of their relaxed length, even up to 1000 percent), and many of these will recover to substantially their initial relaxed length, for example, to within 105 percent of their original relaxed length, upon release of the stretching force. The term "non-elastic" as used herein refers to any material which does not fall within the definition of "elastic," above.

The terms "recover" and "recovery" as used herein refer to a contraction of a stretched material upon termination of a biasing force following stretching of the material by application of the biasing force. For example, if a material having a relaxed, unbiased length of one (1) inch (2.54 cm) is elongated 50 percent by stretching to a length of one and one half (1.5) inches (3.81 cm) the material would be elongated 50 percent (0.5 inch (1.27 cm)) and would have a stretched length that is 150 percent of its relaxed length. If this exemplary stretched material contracted, that is recovered to a length of one and one tenth (1.1) inches (2.79 cm) after release of the biasing and stretching force, the material would have recovered 80 percent (0.4 inch (1.02 cm)) of its one-half (0.5) inch (1.27 cm) elongation. Recovery may be expressed as [(maximum stretch length–final sample length)/(maximum stretch length–initial sample length)]× 100.

The elastic fibrous web layer of the present invention is one which is formed from any material which may be manufactured from suitable elastomeric resins or blends containing the same. As used herein, the terms "layer" or "web" when used in the singular can have the dual meaning of a single element or a plurality of elements. Usually, the material is formed from fibers and filaments of the same or a different elastomeric polymer resin. For example, the elastomeric fibers and/or filaments may be made from elastomeric thermoplastic polymers. As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

All of the elastomeric polymers of the present invention, as would be understood by one skilled in the art, are viscoelastic, (meaning that the material combines the properties of both fluids and solids), and therefore, exhibit different physical and mechanical properties under different conditions. These elastomeric polymers exhibit time dependent behavior and also have different properties at different temperatures. The skilled artisan would understand that these elastomeric polymers obey the time/temperature superposition principle. As a further characterization of these elastomeric polymers, it will be understood that the properties exhibited by these polymers are rate dependent. For instance, when elongating the material at cross-head speeds ranging from 0.5 inches/minute (1.27 cm/min) to 20 inches/minute (50.8 cm/min) at standard laboratory temperature conditions, the properties measured will differ. As an oversimplified example, one might consider the characteristics of SILLY PUTTY®. If the putty is quickly pulled apart, the putty will be brittle; if pulled apart slowly, the material will show ductile behavior and extend a great distance. For these reasons, such properties will be explained in detail in the Examples below when other than standard conditions are used.

These elastomeric materials contain both hookean and rubber-like elastic behavior. What is meant by "hookean" behavior is that it is essentially spring-like at low elongation meaning that it is the linear load elongation portion of the stress/strain curve (depending on the material, e.g., 0.1–30%). "Rubber elasticity" means that the material is essentially spring-like at higher elongations (i.e. greater than the hookean limit and up to its ultimate elongation). The fibers and/or filaments useful in the materials of the present invention may be made from elastomeric thermoplastic polymers such as block copolymers including polyurethanes, copolyether esters, polyamide polyether block copolymers, ethylene vinyl acetates (EVA), block copolymers having the general formula A-B-A', A-B or A-B-A-B like copoly(styrene/ethylene-butylene), styrene-poly(ethylene-propylene)-styrene, styrene-poly(ethylene-butylene)-styrene, (polystyrene/poly(ethylene-butylene)/ polystyrene, poly(styrene/ethylene-butylene/styrene), polystyrene-poly(ethylene-propylene)-polystyrene-poly (ethylene-propylene) and the like.

Useful elastomeric resins include block copolymers having the general formula A-B-A' or A-B, where A and A' are each a thermoplastic polymer endblock which contains a styrenic moiety such as a poly(vinyl arene) and where B is an elastomeric polymer midblock such as an unsaturated conjugated diene, a saturated alkane-type rubber block or a lower alkene polymer. Block copolymers of the A-B-A' type can have different or the same thermoplastic block polymers for the A and A' blocks, and the present block copolymers are intended to embrace linear, branched and radial block copolymers. In this regard, the radial block copolymers may be designated $(A-B)_m$—X, wherein X is a polyfunctional atom or molecule and in which each $(A-B)_m$— radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer", and particularly "A-B-A'" and "A-B" block copolymer, is intended to embrace all block copolymers having such rubbery blocks and thermoplastic blocks as discussed above, which can be extruded (e.g., by meltblowing), and without limitation as to the number of blocks. The components of the elastic fibrous web may be formed from, for example, elastomeric (polystyrene/poly (ethylene-butylene)/polystyrene) block copolymers. Commercial examples of such elastomeric copolymers are, for example, those known as KRATON® materials which are available from Shell Chemical Company of Houston, Tex. KRATONE® block copolymers are available in several different formulations, a number of which are identified in commonly assigned U.S. Pat. No. 4,663,220 to Wisneski et al., and U.S. Pat. No. 5,304,599, to Himes, assigned to Shell Oil Company, Houston, Tex., each of which is hereby incorporated by reference in its entirety. Preferably, polymers composed of an elastomeric A-B-A-B tetrablock copolymer may be used in the practice of this invention. Such polymers are discussed in commonly assigned U.S. Pat. No. 5,332,613 to Taylor et al. In such polymers, A is a thermoplastic polymer block and B is an isoprene monomer unit hydrogenated to a poly(ethylene-propylene) monomer unit. An example of such a tetrablock copolymer is a polystyrene-poly(ethylene-propylene)-polystyrene-poly (ethylene-propylene) or SEPSEP elastomeric block copolymer available from the Shell Chemical Company of Houston, Tex. under the trade designation KRATON® G-1730 and KG 2760 (which is a compounded form of SEPSEP which includes polyethylene wax, a tackifier, etc.).

Other exemplary elastomeric materials which may be used include polyurethane elastomeric materials such as, for example, those available under the trademark ESTANE® from B. F. Goodrich & Co. or MORTHANE® from Morton Thiokol Corp., copolyetherester elastomeric materials such as, for example, those available under the trade designation HYTREL® from E. I. du Pont de Nemours and Company, Inc., and those known as ARNITEL®, formerly available from Akzo Plastics of Arnhem, Holland and now available from DSM of Sittard, Holland.

Another suitable material is a polyether block amide copolymer having the formula:

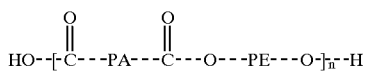

where n is a positive integer, PA represents a polyamide polymer segment and PE represents a polyether polymer segment. In particular, the polyether block amide copolymer has a melting point of from about 150° C. to about 170° C., as measured in accordance with ASTM D-789; a melt index of from about 6 grams per 10 minutes to about 25 grams per 10 minutes, as measured in accordance with ASTM D-1238, condition Q (235° C./1 kg load); a modulus of elasticity in flexure of from about 20 MPa to about 200 MPa, as measured in accordance with ASTM D-790; a tensile strength at break of from about 29 MPa to about 33 MPa as measured in accordance with ASTM D-638 and an ultimate elongation at break of from about 500 percent to about 700 percent as measured by ASTM D-638. A particular embodiment of the polyether block amide copolymer has a melting point of about 152° C. as measured in accordance with ASTM D-789; a melt index of about 7 grams per 10 minutes, as measured in accordance with ASTM D-1238, condition Q (235° C./1 kg load); a modulus of elasticity in flexure of about 29.50 MPa, as measured in accordance with ASTM D-790; a tensile strength at break of about 29 MPa, a measured in accordance with ASTM D-639; and an elongation at break of about 650 percent as measured in accordance with ASTM D-638. Such materials are available in various grades under the trade designation PEBAX® from Atochem Inc. Polymers Division (RILSAN®), of Glen Rock, N.J. Examples of the use of such polymers may be found in U.S. Pat. Nos. 4,724,184, 4,820,572 and 4,923,742 hereby incorporated by reference, to Killian et al., and assigned to the same assignee as this invention.

Elastomeric polymers also include copolymers of ethylene and at least one vinyl monomer such as, for example, vinyl acetates, unsaturated aliphatic monocarboxylic acids, and esters of such monocarboxylic acids. The elastomeric copolymers and formation of elastomeric nonwoven webs from those elastomeric copolymers are disclosed in, for example, commonly assigned U.S. Pat. No. 4,803,117 to Daponte.

The thermoplastic copolyester elastomers include copolyetheresters having the general formula:

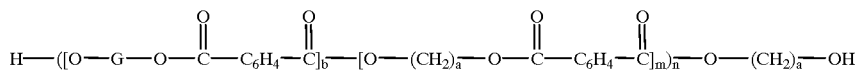

where "G" is selected from the group consisting of poly (oxyethylene)-alpha,omega-diol, poly(oxypropylene)-alpha, omega-diol, poly(oxytetramethylene)-alpha,omega-diol and "a" and "b" are positive integers including 2, 4 and 6, "m" and "n" are positive integers including 1–20. Such materials generally have an elongation at break of from about 600 percent to 750 percent when measured in accordance with ASTM D-638 and a melt point of from about 350° F. to about 400° F. (176 to 205° C.) when measured in accordance with ASTM D-2117.

Commercial examples of such copolyester materials are, for example, those known as ARNITEL®, or those known as HYTREL® as described above. Formation of an elastomeric nonwoven web from polyester elastomeric materials is disclosed in, for example, commonly assigned U.S. Pat. No. 4,741,949 to Morman et al., and U.S. Pat. No. 4,707,398 to Boggs, each of which is hereby incorporated by reference in its entirety.

Elastomeric polymers have been used in the past for many applications but are somewhat limited by their intrinsic properties. These materials have recently been joined by a new class of polymers which has excellent barrier, breathability and elasticity. The new class of polymers is referred to as single site catalyzed polymers such as "metallocene" polymers produced according to a metallocene process.

Such metallocene polymers are available from Exxon Chemical Company of Baytown, Tex. under the trade name EXXPOL® for polypropylene based polymers and EXACT® for polyethylene based polymers. Dow Chemical Company of Midland, Mich. has polymers commercially available under the name ENGAGE®. Preferably, the metallocene polymers are selected from copolymers of ethylene and 1-butene, copolymers of ethylene and 1-hexene, copolymers of ethylene and 1-octene and combinations thereof. For a more detailed description of the metallocene polymers and the process for producing same which are useful in the present invention see commonly assigned PCT Patent Application No. WO 98129246 to Gwaltney et al., which is incorporated herein by reference in its entirety.

As discussed above, one component of the elastic fibrous web may be a continuous filament layer. The continuous filament layer is a layer of continuous, generally parallel filaments, disclosed in commonly assigned U.S. Pat. No. 5,366,793 to Fitts, Jr. et al., and U.S. Pat. No. 5,385,775 to Wright, both of which are incorporated herein by reference in their entirety, and which is described in more detail below in connection with the figures. As used herein, these elastomeric continuous filaments are referred to as "continuous filaments". The continuous filaments have an average diameter ranging from about 40 to about 750 microns and extend along the length (i.e. machine direction) of the elastic fibrous web. Desirably, the elastomeric continuous filaments may have an average diameter in the range from about 50 to about 500 microns, for example, from about 100 to about 200 microns. As used herein, the term "machine direction" or MD means the length of a fabric in the direction in which it is produced. The term "cross machine direction" or CD means the width of fabric, i.e. a direction generally perpendicular to the MD.

Another component of the elastic fibrous web, preferably in combination with the continuous filament layer, is an elastomeric meltblown fiber or microfiber layer. The elastomeric meltblown fiber or microfiber component of the elastic fibrous web is formed utilizing a conventional meltblowing process. Meltblowing processes generally involve extruding a molten thermoplastic material through a plurality of fine, usually circular, capillaries of a meltblowing die as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin et al., assigned to Exxon Research and Engineering Company. Meltblown fibers are microfibers which are generally smaller than 10 microns ($\mu$m) in average diameter, and are generally tacky when deposited onto a collecting surface.

As used herein the term "microfibers" means small diameter fibers having an average diameter not greater than about 75 microns ($\mu$m), for example, having an average diameter of from about 0.5 microns ($\mu$m) to about 50 microns ($\mu$m), or more particularly, microfibers may have an average diameter of from about 2 microns ($\mu$m) to about 40 microns ($\mu$m). Another frequently used expression of fiber diameter is denier, which is defined as grams per 9000 meters of a fiber and may be calculated as fiber diameter in microns ($\mu$m) squared, multiplied by the density in grams/cc, multiplied by 0.00707. A lower denier indicates a finer fiber and a higher denier indicates a thicker or heavier fiber. For example, the diameter of a polypropylene fiber given as 15 microns ($\mu$m) may be converted to denier by squaring, multiplying the result by 0.89 g/cc and multiplying by 0.00707. Thus, a 15 micron ($\mu$m) polypropylene fiber has a denier of about 1.42 ($15^2 \times 0.89 \times 0.00707 = 1.415$). Outside the United States the unit of measurement is more commonly the "tex", which is defined as the grams per kilometer of fiber. Tex may be calculated as denier/9.

The elastomeric meltblown fiber component of the present invention may be a mixture of elastic and nonelastic fibers or particulates. For an example of such a mixture, reference is made to U.S. Pat. No. 4,209,563, to Sisson, assigned to the Procter and Gamble Company, incorporated herein by reference, in which elastomeric and non-elastomeric fibers are commingled to form a single coherent web of randomly dispersed fibers. Another example of such an elastic composite web would be one made by a technique such as disclosed in previously referenced U.S. Pat. No. 4,741,949. That patent discloses an elastic nonwoven material which includes a mixture of meltblown thermoplastic fibers and other materials. The fibers and other materials are combined in the gas stream in which the meltblown fibers are borne so that an intimate entangled commingling of meltblown fibers and other materials, e.g., wood pulp, staple fibers or particulates such as, for example, activated charcoal, clays, starches, or hydrocolloid (hydrogel) particulates commonly referred to as super-absorbents occurs prior to collection of the fibers upon a collecting device to form a coherent web of randomly dispersed fibers.

Processing aids may be added to the elastomeric polymer as well. A polyolefin, for example, may be blended with the elastomeric polymer (e.g., the elastomeric block copolymer) to improve the processability of the composition. The polyolefin must be one which, when so blended and subjected to an appropriate combination of elevated pressure and elevated temperature conditions, is extrudable, in blended form, with the elastomeric polymer. Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothene NA 601 (also referred to herein as PE NA 601 or polyethylene NA 601). Two or more of the polyolefins may be utilized. Extrudable blends of elastomeric polymers and polyolefins are disclosed in, for example, previously referenced U.S. Pat. No. 4,663,220.

Desirably, the elastomeric meltblown fibers should have some tackiness or adhesiveness to enhance autogenous bonding. For example, the elastomeric polymer itself may be tacky when formed into fibers or, alternatively, a compatible tackifying resin may be added to the extrudable elastomeric compositions described above to provide tackified elastomeric fibers that autogenously bond. As used herein, the term "autogenous bonding" means bonding provided by fusion and/or self-adhesion of fibers and/or filaments without an applied external adhesive or bonding agent. Autogenous bonding may be provided by contact between fibers and/or filaments while at least a portion of the fibers and/or filaments are semi-molten or tacky. Autogenous bonding may also be provided by blending a tackifying resin with the thermoplastic polymers used to form the fibers and/or filaments. Fibers and/or filaments formed from such a blend can be adapted to self-bond with or without the application of pressure and/or heat. Solvents may also be used to cause fusion of fibers and filaments which remain after the solvent is removed.

Typical tackifying resins and tackified extrudable elastomeric compositions are disclosed in commonly assigned U.S. Pat. No. 4,789,699 to Kieffer et al., which is incorporated herein by reference. Any tackifier resin can be used which is compatible with the elastomeric polymer and can withstand the high processing (e.g., extrusion) temperatures. If the elastomeric polymer (e.g., elastomeric block copolymer) is blended with processing aids such as, for example, polyolefins or extending oils, the tackifier resin should also be compatible with those processing aids. Generally, hydrogenated hydrocarbon resins are preferred tackifying resins, because of their better temperature stability. REGALREZ® and ARKON® P series tackifiers are examples of hydrogenated hydrocarbon resins. REGALREZ® hydrocarbon resins are available from Hercules Incorporated. ARKON® P series resins are available from Arakawa Chemical (U.S.A.) Incorporated. Other tackifying resins which are compatible with the other components of the composition and can withstand the high processing temperatures, can also be used.

Typically, the blend used to form the elastomeric meltblown fibers includes, for example, from about 40 to about 80 percent by weight elastomeric polymer, from about 5 to about 40 percent processing aid and from about 5 to about 40 percent resin tackifier.

It is also possible to have other materials blended with the elastomeric polymer used to produce a layer according to this invention like fluorocarbon chemicals to enhance chemical repellency which may be, for example, any of those taught in commonly assigned U.S. Pat. No. 5,178,931 to Perkins et al., fire retardants for increased resistance to fire and/or pigments to give each layer the same or distinct colors. Fire retardants and pigments for spunbond and meltblown thermoplastic polymers are known in the art and are normally internal additives. A pigment, if used, is generally present in an amount less than 5 weight percent of the layer while other materials may be present in a cumulative amount less than 25 weight percent.

Items made from the laminates of this invention may also have topical treatments applied to them for more specialized functions. Such topical treatments and their methods of application are known in the art and include, for example, alcohol repellency treatments, anti-static treatments and the like, applied by spraying, dipping, etc. An example of such a topical treatment is the application of Zelec® antistat (available from E. I. du Pont de Nemours and Company, Wilmington, Del.).

Hindered amines are useful as ultraviolet light stabilizers and are discussed in commonly assigned U.S. Pat. No. 5,200,443 to Hudson. Examples of such amines are Hostavin TMN 20 from American Hoescht Corporation of Somerville, N.J. Cyasorb UV-3668 from American Cyanamid Company of Wayne, N.J. and Uvasil-299 from Enichem Americas, Inc. of N.Y. A particularly well suited hindered amine is that commercially available as Chimassorb® 944 FL from the Ciba-Geigy Corporation of Hawthorne, N.Y., and having CAS registry number 70624-18-9. The Chimassorb® 944 FL amine is incorporated into polypropylene pellets suitable for meltblowing by the Standridge Color Corporation of Social Circle, Georgia, to produce a product which is commercially available under the designation SCC-8784.

The gatherable layer is one which will be attached to at least one surface of the elastic fibrous web which is formed of at least one layer of elastomeric continuous filaments and at least one layer of elastomeric meltblown fibers. Examples of suitable gatherable layers include film layers and nonwoven web layers. Gatherable layers may be made from any thermoplastic polymer described herein and the polymer-may be either elastic, inelastic or a combination of elastic and inelastic polymers. Other thermoplastic polymers include polypropylene, high density polyethylene, low density polyethylene, linear low density polyethylene, cellophane, polyvinyl acetate, polyvinyl alcohol, polycaprolactam, polyester, polyamide, polyethylene terephthalate, polybutylene terephthalate, polytetrafluoroethylene, or mixtures or coextrusions of one or more of these materials. If the gatherable layer is a film layer, the film layer may be made from either cast or blown processes.

Further, composite elastic materials may be, for example, "stretch bonded" laminates and "neck bonded" laminates. Conventionally, "stretch bonded" refers to an elastic member being bonded to another member while the elastic member is extended at least about 25 percent of its relaxed length. "Stretch bonded laminate" refers to a composite material having at least two layers in which one layer is a gatherable layer and the other layer is an elastic layer. The layers are joined together when the elastic layer is in an extended condition so that upon relaxing the layers, the gatherable layer is gathered. Such a multilayer composite elastic material may be stretched to the extent that the nonelastic material gathered between the bond locations allows the elastic material to elongate. One type of stretch bonded laminate is disclosed, for example, by commonly assigned U.S. Pat. No. 4,720,415 to Vander Wielen et al., in which multiple layers of the same polymer produced from multiple banks of extruders are used. Other composite elastic materials are disclosed in previously referenced U.S. Pat. Nos. 4,789,699 to Kieffer et al., 4,781,966 to Taylor and commonly assigned U.S. Pat. Nos. 4,657,802 and 4,652,487 to Morman and 4,655,760 to Morman et al, the disclosures of which are hereby incorporated by reference in their entireties.

Conventionally, "neck bonded" refers to an elastic member being bonded to a non-elastic member while the non-elastic member is extended or necked, i.e., drawn in widthwise. "Neck bonded laminate" refers to a composite material having at least two layers in which one layer is a necked, non-elastic layer and the other layer is an elastic layer. The layers are joined together when the non-elastic layer is in an extended condition. Examples of neck-bonded laminates are such as those described in commonly assigned U.S. Pat. Nos. 5,226,992, 4,981,747, 4,965,122 and 5,336,545 to Morman.

Referring now to the drawings wherein like reference numerals represent the same or equivalent structure and, in particular, to FIG. 1 of the drawings there is schematically illustrated at 10 a process for forming a composite elastic material which includes an elastic fibrous web.

According to the present invention, an elastic fibrous web 130 may be unwound from a supply roll or may be formed in a continuous process such as, for example, the process described in more detail below and shown in FIG. 2. The elastic fibrous web 130 passes through a nip formed by a pair of pinch rollers 132 and 134.

A first gatherable layer 24 is unwound from a supply roll 26 and travels in the direction indicated by the arrow associated therewith as the supply roll 26 rotates in the direction of the arrows associated therewith. A second gatherable layer 28 is unwound from a second supply roll 30 and travels in the direction indicated by the arrow associated therewith as the supply roll 30 rotates in the direction of the arrows associated therewith.

The first gatherable layer 24 and second gatherable layer 28 pass through the nip 32 of the bonder roller arrangement 34 formed by the bonder rollers 36 and 38. The first gatherable layer 24 and/or the second gatherable layer 28 may be formed by extrusion processes such as, for example, meltblowing processes, spunbonding processes or film extrusion processes and passed directly through the nip 32 without first being stored on a supply roll.

The peripheral linear speed of the pinch rollers 132 and 134 may be controlled to be less than the peripheral linear speed of the rollers of the bonder roller arrangement 34 to stabilize the stretched material and to control the amount of stretching. By adjusting the difference in the speeds of the rollers, the elastic fibrous web 130 is tensioned so that it stretches a desired amount and is maintained in such stretched condition while the first gatherable layer 24 and second gatherable layer 28 are joined to the elastic fibrous web 130 during their passage through the bonder roller arrangement 34 to form a composite elastic material 40.

The composite elastic material 40 immediately relaxes upon release of the tensioning force whereby the first gatherable layer 24 and the second gatherable layer 28 are gathered in the composite elastic material 40. The composite elastic material 40 is then wound up on a winder roll 42. Processes of making composite elastic materials of this type are described in, for example, previously referenced U.S. Pat. No. 4,720,415.

The gatherable layers 24 and 28 may be nonwoven materials such as, for example, spunbonded webs, meltblown webs, or bonded carded webs. In one embodiment of the present invention, one or both of the gatherable layers 24 and 28 is a multilayer material having, for example, at least one layer of spunbonded web joined to at least one layer of meltblown web, bonded carded web or other suitable material.

One or both of the gatherable layers 24 and 28 may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbent materials, occurs prior to collection of the meltblown fibers upon a collecting device to form a coherent web of randomly dispersed meltblown fibers and other materials such as disclosed in commonly assigned U.S. Pat. No. 4,100,324, to Anderson et al., the disclosure of which is hereby incorporated by reference.

One or both of the gatherable layers 24 and 28 may be made of pulp fibers, including wood pulp fibers, to form a material such as, for example, a tissue layer. Additionally, the gatherable layers may be layers of hydraulically entangled fibers such as, for example, hydraulically entangled mixtures of wood pulp and staple fibers such as disclosed in previously referenced U.S. Pat. No. 4,781,966.

The gatherable layers 24 and 28 will be joined to the elastic fibrous web 130 by bonding means as discussed more fully below. Joining may be produced by applying heat and/or pressure to the elastic fibrous web 130 and the gatherable layers 24 and 28 by heating these portions to at least the softening temperature of the material with the lowest softening temperature to form a reasonably strong and permanent bond between the re-solidified softened portions of the elastic fibrous web 130 and the gatherable layers 24 and 28.

Figure 3:
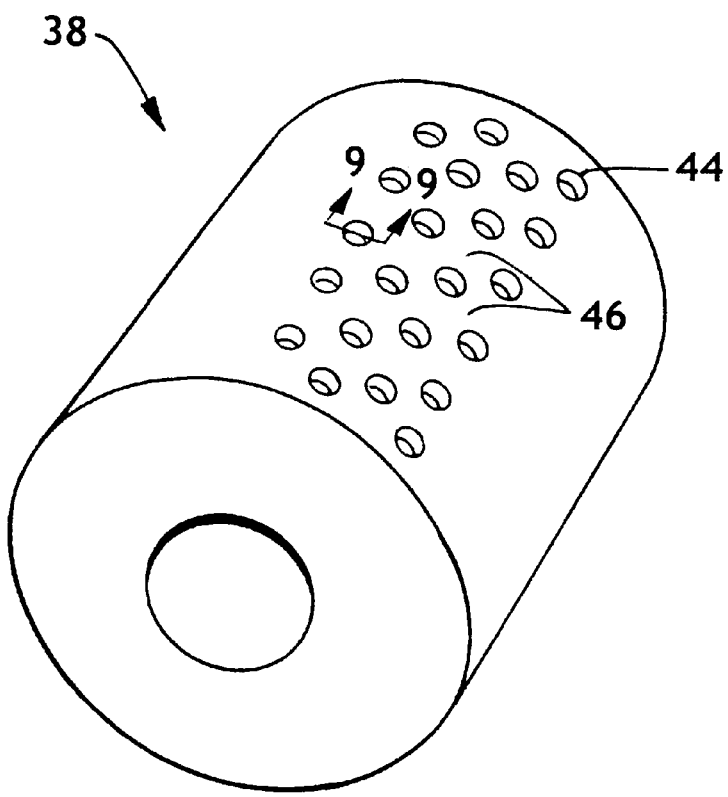
FIG. 3 is a partial perspective view of a pattern un-bonded (PUB) calender roller that can be used in accordance with the process and apparatus of FIG. 1.
Figure 8:
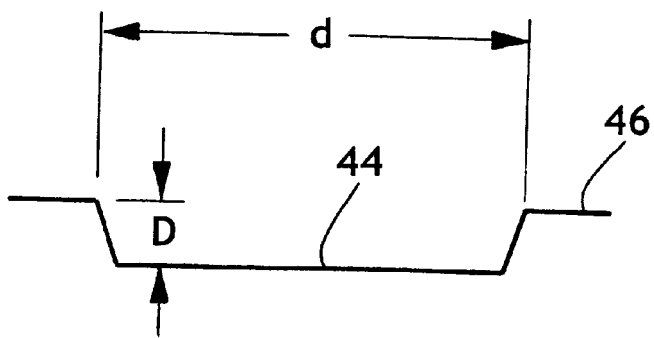
FIG. 8 is an enlarged cross-sectional view taken along the line 9—9 of FIG. 3.

The bonder roller arrangement 34 will have a patterned un-bonded (PUB) calender roller 38 having recessed areas 44 and an anvil roller 36 which may be smooth or another PUB calender roller. More specifically and with reference to FIG. 3, the PUB calender roller 38 will have a bonding pattern on its outermost surface comprising a continuous pattern of land area 46 defining a plurality of discrete recessed areas 44, (also known asy openings, apertures or holes). Turning to FIG. 8, a cross-sectional side view of a circular recessed area 44 is shown in an enlarged view. The depth D of the individual recessed areas 44 can be any depth suitable to achieve the desired effect. Likewise, diameter d can be any suitable diameter. Each of the recessed areas 44 in said roller or rollers defined by the continuous land area 46 forms a discrete unbonded area in at least one surface of the composite elastic material 42 in which the fibers or filaments of the web are substantially or completely unbonded. Stated alternatively, the continuous pattern of land area 46 in said roller or rollers forms a continuous pattern of bonded areas that define a plurality of discrete unbonded areas on at least one surface of the composite elastic material. The composite elastic material of the present invention will usually have a bonded area of at least about 15% to about 80% per unit area of material. Preferably, the material will have 20 to 60% bonded area, and most preferably, 30 to 60% bonded area. It will be understood that the percent bonded area of the material is inversely proportional to the percent of recessed areas on the surface of the PUB roller. Therefore, to produce a material having at least about 15 to about 80% bonded area, the PUB roller will have about 85 to about 20% recessed area on its surface.

One or both of the anvil roller 36 and the calender roller 38 may be heated and the pressure between these two rollers may be adjusted by well-known means to provide the desired temperature, if any, and bonding pressure to join the gatherable layers to the elastic fibrous web. Various patterns of recessed areas 44 can be used on the surface of the calender rollers, depending upon the desired tactile properties of the final composite laminate material. The recessed areas 44 may have any one of or combination of the following configurations including circular, oval, rectangular, and square shapes. The most preferred shape is a circular shape. When the gatherable layer is a material such as, for example, spunbonded polypropylene, such bonding can be performed at temperatures as low as 60° F. (15.6° C.). A range of temperatures for the calender rollers during bonding between a gatherable layer such as, for example, spunbond polypropylene and an elastic fibrous web is 60° to 180° F. (15.6 to 82.2° C.).

With regard to thermal bonding, one skilled in the art will appreciate that the temperature to which the materials are heated for heat-bonding will depend not only on the temperature of the heated roller(s) or other heat sources but on the residence time of the materials on the heated surfaces, the compositions of the materials, the basis weights of the materials and their specific heats and thermal conductivities.

It has generally been understood that increased pressure results in better bonding and overall cohesion between the elastomeric fibrous web and gatherable layer. For laminates of the present invention, however, it has been found that high bonding pressures are not necessary to achieve the desirable properties. In fact, there is evidence of a negative effect on properties when the bonding gage pressure is increased from about 25 to about 40 psi (0.17 to 0.28 MPa). (For a PUB pattern of ~35% bond area, using a 7 inch (17.8 cm) diameter roll, a gage pressure of 25 and 40 psi converts to metal-to-metal loading of 40,450 psi and 52,457 psi of pressure on the contact area.) Therefore, metal-to-metal loadings in the area of about 35,000 psi to about 50,000 psi are preferred while, loadings of about 40,000 psi to about 52,000 psi are especially preferred. The largest and most significant effect is seen in stress relaxation properties for composite elastic materials which are laminated by the PUB patterned calender roller in accordance with the present invention as is discussed in more detail below in the examples. The 6 hour load loss increased from 52% to 69% with the pressure increase. For this reason, bonding pressures less than about 40 psi(0.28 MPa) are preferred.

As discussed above, an important component of the composite elastic material 40 is the elastic fibrous web 130.That elastic web may contain two layers of materials; preferably with at least one layer as a layer of elastomeric meltbiown fibers and at least one other layer as a layer of substantially parallel rows of elastomeric continuous filaments autogenously bonded to at least a portion of the elastomeric meltblown fibers.

Typically, the elastic fibrous web will contain at least about 20 percent, by weight, of elastomeric continuous filaments. For example, the elastic fibrous web may contain from about 20 percent to about 95 percent, by weight, of the elastomeric continuous filaments. Desirably, the elastomeric continuous filaments will constitute from about 40 to about 90 percent, by weight, of the elastic fibrous web.

Figure 2:
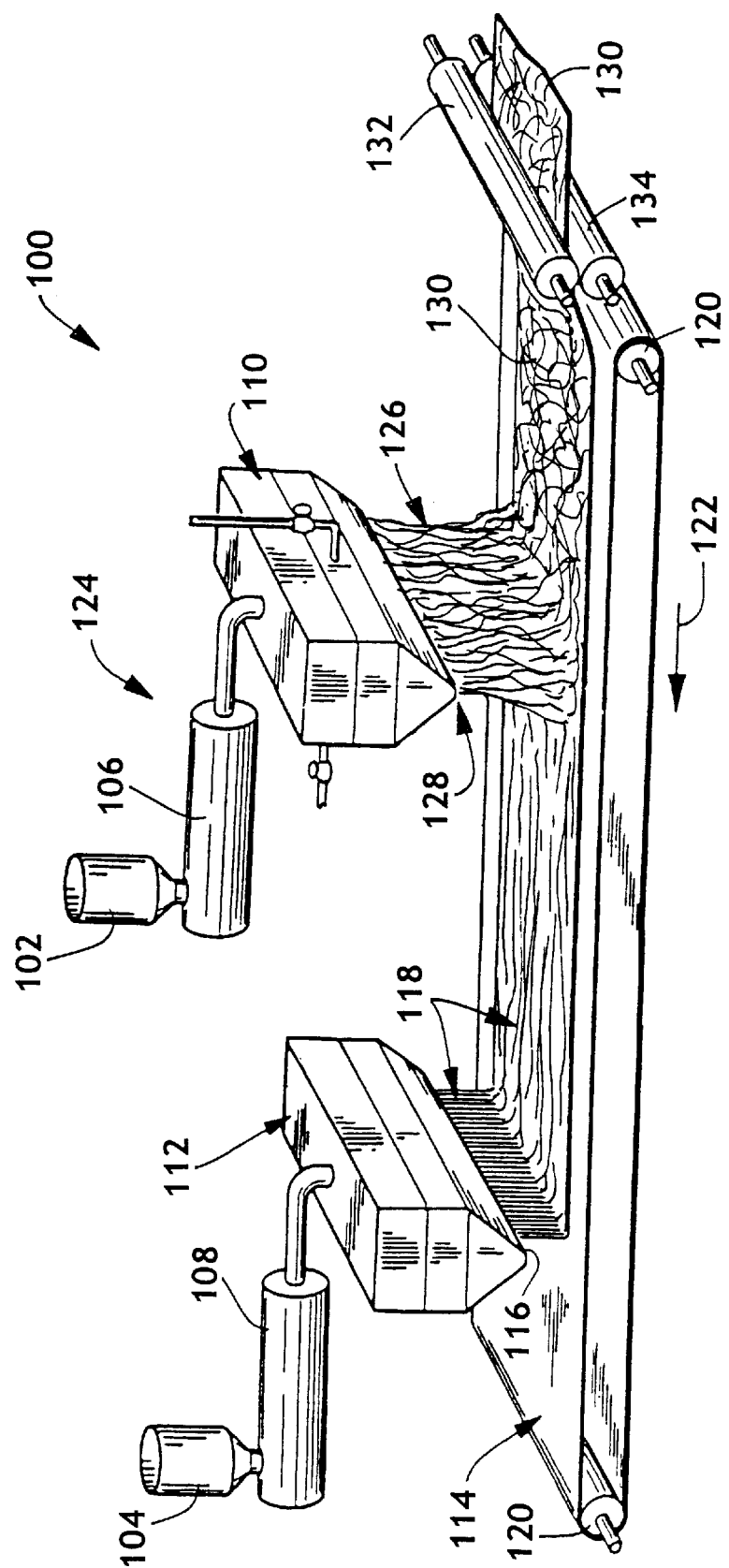
FIG. 2 is a schematic drawing of an exemplary process for forming an exemplary elastic fibrous web which is a component of the composite elastic material of the present invention.

FIG. 2 is a schematic view of a process for forming an elastic fibrous web which is used as a component of the composite elastic material of the present invention. The process is generally represented by reference numeral 100. In forming the fibers and the filaments which are used in the elastic fibrous web, pellets or chips, etc. (not shown) of an extrudable elastomeric polymer are introduced into a pellet hoppers 102 and 104 of extruders 106 and 108.

Each extruder has an extrusion screw (not shown) which is driven by a conventional drive motor (not shown). As the polymer advances through the extruder, due to rotation of the extrusion screw by the drive motor, it is progressively heated to a molten state. Heating of the polymer to the molten state may be accomplished in a plurality of discrete steps with its temperature being gradually elevated as it advances through discrete heating zones of the extruder 106 toward a meltblowing die 110 and extruder 108 toward a continuous filament forming means 112. The meltblowing die 110 and the continuous filament forming means 112 may be yet another heating zone where the temperature of the thermoplastic resin is maintained at an elevated level for extrusion. Heating of the various zones of the extruders 106 and 108 and the meltblowing die 110 and the continuous filament forming means 112 may be achieved by any of a variety of conventional heating arrangements (not shown).

The elastomeric continuous filament component of the elastic fibrous web may be formed utilizing a variety of extrusion techniques. For example, the elastomeric filaments may be formed utilizing one or more conventional meltblowing die arrangements which have been modified to remove the heated gas stream (i.e., the primary air stream) which flows generally in the same direction as that of the extruded threads to attenuate the extruded threads. This modified meltblowing die arrangement 112 usually extends across a foraminous collecting surface 114 (also referred to as "belt") in a direction which is substantially transverse to the direction of movement of the collecting surface 114. The modified die arrangement 112 includes a linear array 116 of small diameter capillaries aligned along the transverse extent of the die with the transverse extent of the die being approximately as long as the desired width of the parallel rows of elastomeric continuous filaments which is to be produced. That is, the transverse dimension of the die is the dimension which is defined by the linear array of die capillaries. Typically, the diameter of the capillaries will be on the order of from about 0.01 inches (0.0254 cm) to about 0.02 inches (0.0508 cm), for example, from about 0.0145 to about 0.018 inches (0.0368 to 0.0457 cm). From about 5 to about 50 such capillaries will be provided per linear inch (2.54 cm) of die face. Typically, the length of the capillaries will be from about 0.05 inches (0.127 cm) to about 0.20 inches (0.508 cm), for example, about 0.113 inches (0.287 cm) to about 0.14 inches (0.356 cm) long. A meltblowing die can extend from about 20 inches (50.8 cm) to about 60 or more inches (152.4 cm) in length in the transverse direction.

Since the heated gas stream (i.e., the primary air stream) which flows past the die tip is greatly reduced or absent, it is desirable to insulate the die tip or provide heating elements to ensure that the extruded polymer remains molten and flowable while in the die tip. Polymer is extruded from the array 116 of capillaries in the modified die 112 to create extruded elastomeric continuous filaments 118.

The elastomeric continuous filaments 118 have an initial velocity as they leave the array 116 of capillaries in the modified die 112. These filaments 118 are deposited upon a foraminous collecting surface 114 which should be moving at least at the same velocity as the initial velocity of the filaments 118. This foraminous collecting surface 114 is an endless belt conventionally driven by collecting surface rollers 120. The continuous filaments 118 are deposited in substantially parallel alignment on the surface of the foraminous collecting surface 114 which is rotating as indicated by the arrow 122 in FIG. 2. Vacuum boxes (not shown) may be used to assist in retention of the matrix on the surface of the belt 114. The tip of the die 112 should be as close as practical to the surface of the belt 114 upon which the elastomeric continuous filaments 118 are collected. For example, this forming distance may be from about 0.5 inches (1.27 cm) to about 10 inches (25.4 cm). Desirably, this distance is from about 0.75 inches (1.9 cm) to about 8 inches (20.3 cm).

It may be desirable to have the foraminous collecting surface 114 moving at a speed that is much greater than the initial velocity of the elastomeric continuous filaments 118 in order to enhance the alignment of the filaments 118 into substantially parallel rows and/or elongate the filaments 118 so they achieve a desired diameter. For example, alignment of the elastomeric continuous filaments 118 may be enhanced by having the foraminous collecting surface 114 move at a velocity from about 2 to about 10 times greater than the initial velocity of the elastomeric continuous filaments 118. Even greater speed differentials may be used if desired. While different factors will affect the particular choice of velocity for the foraminous collecting surface 114, it will typically be from about four to about eight times faster than the initial velocity of the elastomeric continuous filaments 118.

Desirably, the elastomeric continuous filaments are formed at a density per inch of width of material which corresponds generally to the density of capillaries on the die face. For example, the filament density per inch of width of material may range from about 10 to about 120 such filaments per inch (2.54 cm) width of material. Typically, lower densities of filaments (e.g., 10–35 filaments per inch (2.54 cm) of width) may be achieved with only one filament forming die. Higher densities (e.g., 35–120 filaments per inch (2.54 cm) of width) may be achieved with multiple banks of filament forming equipment.

The elastomeric meltblown fiber or microfiber 126 component of the elastic fibrous web 130 is formed utilizing a conventional meltblowing process represented by reference numeral 124. In the meltblown die arrangement 110, the position of air plates which, in conjunction with a die portion define chambers and gaps, may be adjusted relative to the die portion to increase or decrease the width of the attenuating gas passageways so that the volume of attenuating gas passing through the air passageways during a given time period can be varied without varying the velocity of the attenuating gas. Generally speaking, lower attenuating gas velocities and wider air passageway gaps are generally preferred if substantially continuous meltblown fibers or microfibers are to be produced.

The two streams of attenuating gas converge to form a stream of gas which entrains and attenuates the molten threads, as they exit the orifices, into fibers or, depending upon the degree of attenuation, microfibers, of a small diameter which is usually less than the diameter of the orifices. The gas-borne fibers or microfibers 126 are blown, by the action of the attenuating gas, onto a collecting arrangement which, in the embodiment illustrated in FIG. 2, is the foraminous collecting surface 114 which carries the elastomeric continuous filament 118 in substantially parallel alignment. The fibers or microfibers 126 are collected as a coherent matrix of fibers on the surface of the elastomeric continuous filaments 118 and foraminous endless belt 114 which is rotating as indicated by the arrow 122 in FIG. 2. If desired, the meltblown fibers or microfibers 126 may be collected on the belt 114 at numerous impingement angles. Vacuum boxes (not shown) may be used to assist in retention of the matrix on the surface of the belt 114. Typically the tip 128 of the meltblowing die 110 is from about 6 inches (15.24 cm) to about 14 inches (35.56 cm) from the surface of the belt 114 upon which the fibers are collected. The entangled fibers or microfibers 126 autogenously bond to at least a portion of the elastomeric continuous filaments 118 because the fibers or microfibers 126 are still somewhat tacky or molten while they are deposited on the elastic continuous filaments 118, thereby forming the elastic fibrous web 130.

At this point, it may be desirable to lightly compact the elastic fibrous web of meltblown fibers and filaments in order to enhance the autogenous bonding. This calendering may be accomplished with a pair of patterned or un-patterned pinch rollers 132 and 134 under sufficient pressure (and temperature, if desired) to cause permanent autogenous bonding between the elastomeric continuous filaments and the elastomeric meltblown fibers.

As discussed above, the elastomeric continuous filaments and elastomeric meltblown fibers are deposited upon a moving foraminous surface. In one embodiment of the invention, meltblown fibers are formed directly on top of the extruded elastomeric continuous filaments. This is achieved by passing the filaments and the foraminous surface under equipment which produces meltblown fibers. Alternatively, a layer of elastomeric meltblown fibers may be deposited on a foraminous surface and substantially parallel rows of elastomeric continuous filaments may be formed directly upon the elastomeric meltblown fibers. Various combinations of filament forming and fiber forming equipment may be set up to produce different types of elastic fibrous webs. For example, the elastic fibrous web may contain alternating layers of elastomeric continuous filaments and elastomeric meltblown fibers. Several dies for forming meltblown fibers or creating elastomeric continuous filaments may also be arranged in series to provide superposed layers of fibers or filaments.

Figure 4:
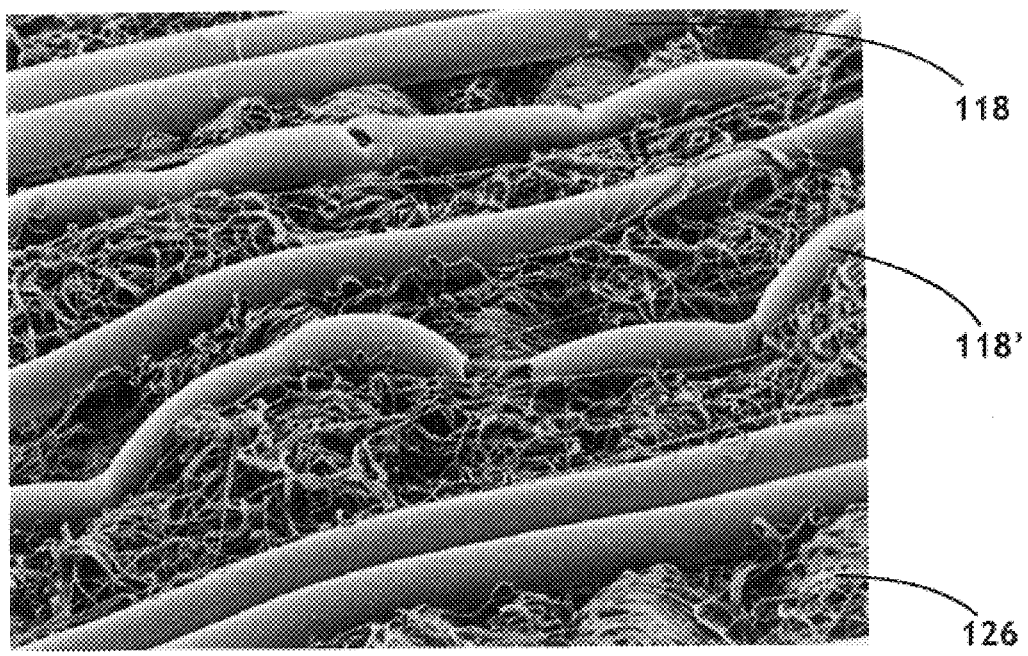
FIG. 4 is a scanning electron micrograph of a fibrous elastic web wherein damage to the continuous filament was caused by prior art bonding using point-bonded patterned roll calendering.
Figure 5:
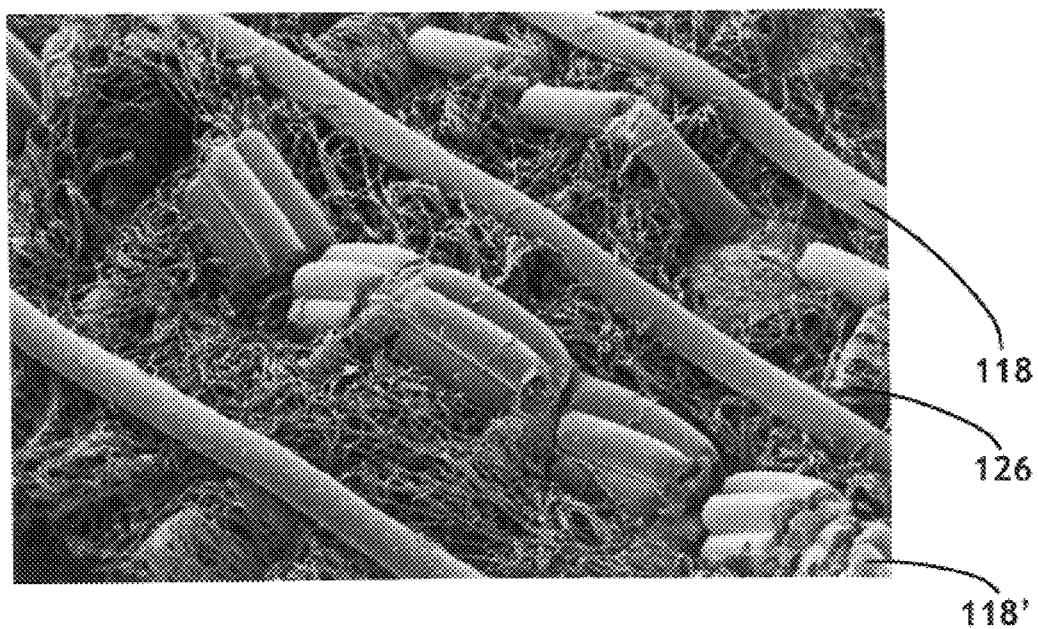
FIG. 5 is a scanning electron micrograph of the fibrous elastic web of FIG. 4, after the fabric has been subjected to use conditions, wherein damage to the continuous filament caused by the prior art point-bonded patterned roll calendering is exacerbated by the use conditions.

As briefly referred to in the background section above, FIG. 4 is a scanning electron micrograph of elastomeric continuous filaments 118 which have been attached to elastomeric meltblown fibers 126 and bonded using patterned (Ramisch) rolls. The continuous filament has been torn, nicked, cut and the like as exemplified by 118'. Such damage affects the elastic properties and, thus, the performance of the material and laminates thereof by causing the fibers to completely break during use, at body temperature, and under stretched conditions as can be seen in FIG. 5. FIG. 5 is a scanning electron micrograph of the material of FIG. 4 after being subjected to use conditions. In this Figure, it can be seen that the torn, nicked, cut filaments 118' of FIG. 4 have now completely broken. When this occurs, the inherent latency will have little or no affect on the broken filaments, and thus the entire material, because activation of the elastic property has been interrupted by the broken filaments.

Figure 6:
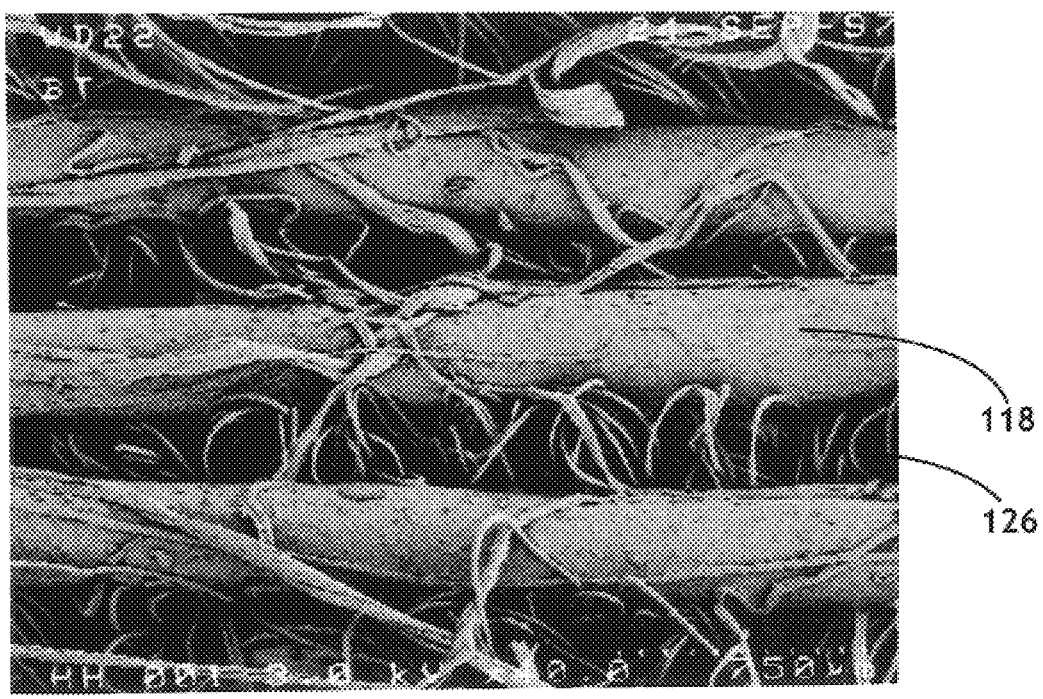
FIG. 6 is a scanning electron micrograph of a fibrous elastic web, after the fabric has been subjected to use conditions, wherein bonding of the layers was achieved by the use of smooth roll calendering.
Figure 7:
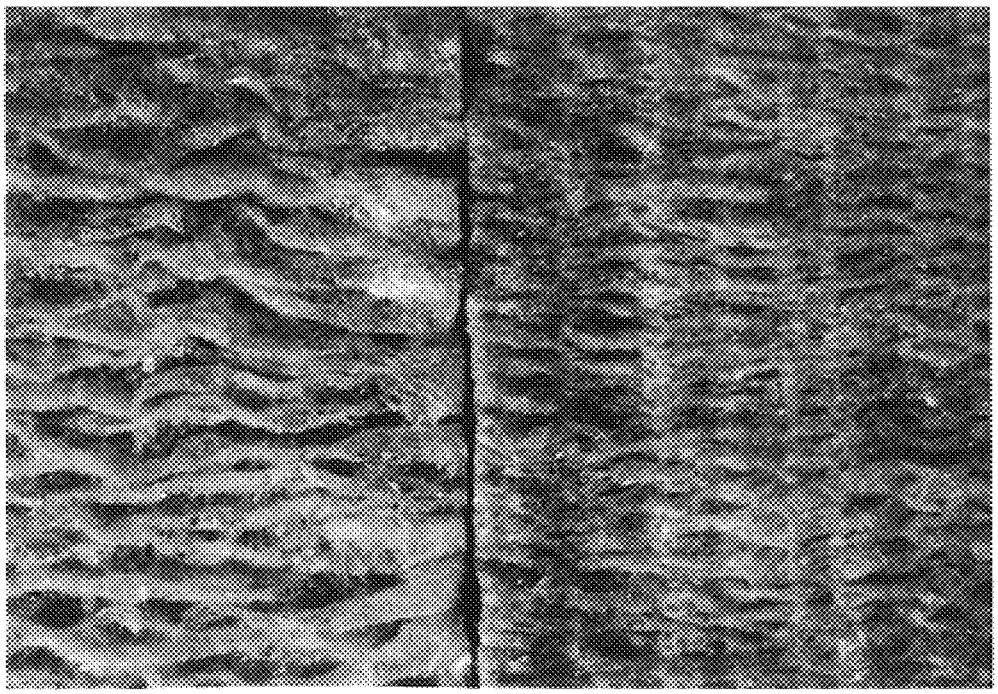
FIG. 7 is a photographic view showing on the right side of the photo the undesirable lack of loftiness of a laminate that has been bonded using the prior art smooth roll calendering, and on the left side of the photo, the loftiness of a laminate that has been bonded using the prior art point-bonded patterned roll calendering.
Figure 9:
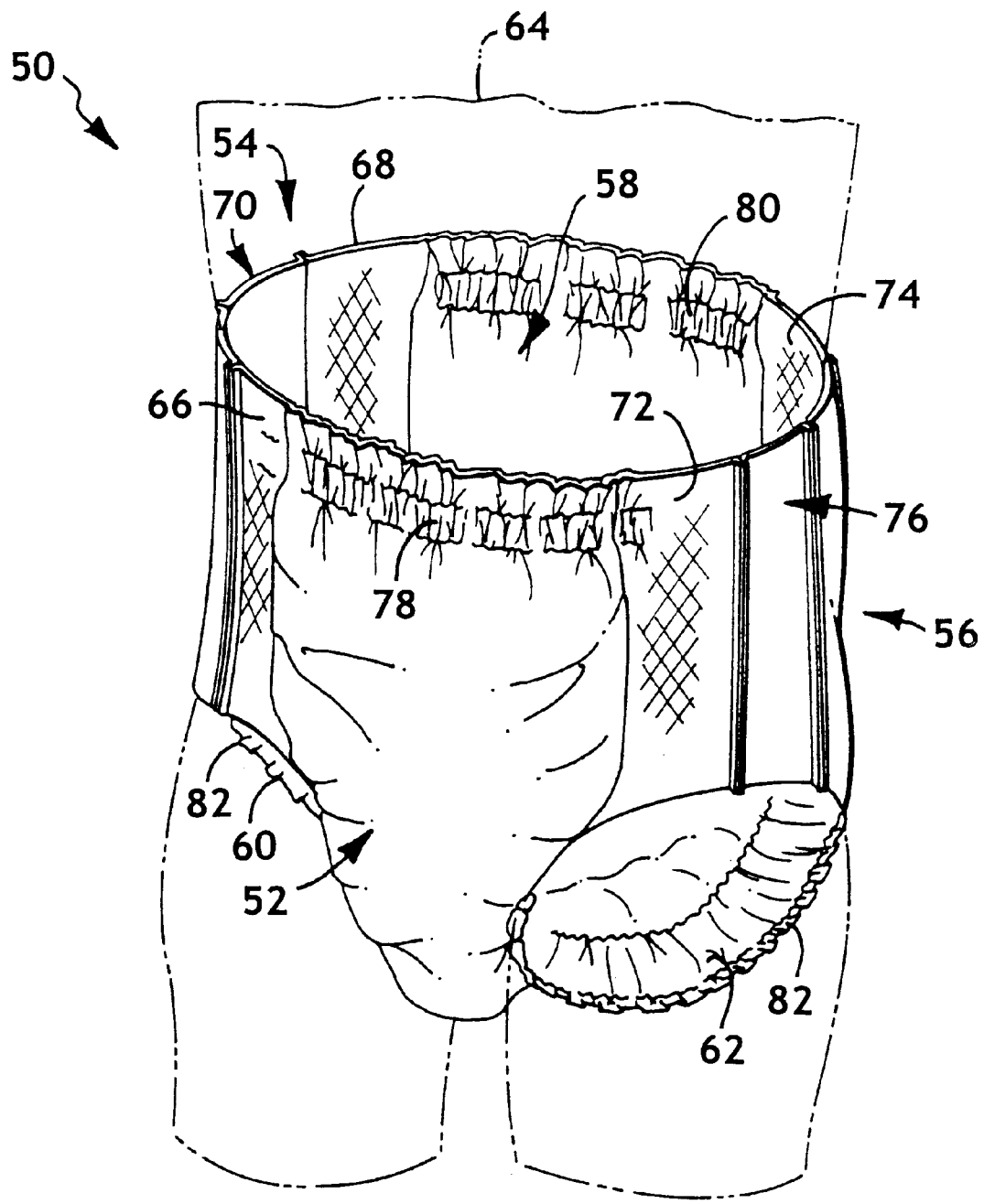
FIG. 9 is a perspective view of an exemplary article, in this case, a training pant, utilizing the elastic fibrous web of the present invention in the side panels and waistband of the garment.

As for the prior art method of using smooth calender rolls to bond the layers together, reference was previously made to PCT publication number WO 98/29251 which describes a means of solving this problem. Smooth roll calendering resulted in improved dimensional stability (e.g. less stress relaxation and creep) because the continuous filaments were not broken during calendering as can be seen in FIG. 6. In FIG. 6, a material as described above for FIG. 4, has been bonded this time with the smooth calender rolls. Again, the elastomeric continuous filaments 118 have been attached to elastomeric meltblown fibers 126 to form an elastic fibrous web. This time, the elastomeric continuous filaments 118 were not damaged by bonding. In fact, the laminate exhibited improved inherent latency because the elastomeric continuous filaments were not damaged. But, the disadvantage of this method was that the inherent latency, at times, was too strong, resulting in processing difficulties (the material tended to shrink so much such that it was too difficult process) and "red marking" occurred when the material was used, e.g., in a diaper. Further, the resulting laminate lost its loftiness (i.e., it was flat), thus having little or no "cloth-like" aesthetics. In FIG. 7, on the right side of the photo, a composite elastic material has been smooth roll calendered as compared to the composite elastic material on the left side of the photo, in which the material was patterned roll calendered. The material made using smooth roll calendering is clearly less lofty, and therefore less attractive to the consumer. Referring now to FIG. 9, there is illustrated a disposable garment 50 incorporating a composite elastic material made according to the present invention. Although training pants are shown in FIG. 9, it will be understood that use of the composite elastic material produced according to the present invention is not limited to such articles and may also be used in a wide variety of applications including, but not limited to, diapers, incontinence devices, cuffs for garments such as surgical gowns and the like.

Referring again to FIG. 9, the disposable garment 50 includes waste containment section 52 and two side panels 54 and 56 defining a waist opening 58 and a pair of leg openings 60 and 62. FIG. 9 illustrates the disposable garment 50 fitted on a wearer's torso 64 in dashed lines. Side panel 54 includes stretchable side member 66 and stretchable side member 68 connecting intermediate member 70 which is made of a non-stretchable material. Similarly, side panel 56 includes stretchable side member 72 and stretchable side member 74 connecting intermediate member 76 which is made of a non-stretchable material. Disposable garment 50 also includes front waist elastic member 78 and rear waist elastic member 80 for providing additional conformability along waist opening 58. Leg elastics 82 are provided with waste containment section 52 between side panels 54 and 56.

The composite elastic material of the present invention may be used to form various portions of the disposable garment 50 and particularly, the side panels 54 and 56. The laminate material may also be used in the leg elastics 82 and waist elastic member 78 of the disposable garment 50.

The following examples illustrate the preparation of the composite elastic materials in accordance with the present invention.

EXAMPLES

Samples of the present invention and comparative examples were prepared as described below. The samples were then subjected to the following tests.

Basis Weight

The weight of the samples was determined by cutting a piece (3 inch (7.62 cm) by 7 inch (17.78 cm)) of an unstretched composite elastic material and weighing it on a conventional scale. The weight was recorded in grams. The basis weight was determined by dividing the weight by the area of the cut sample. Likewise, the basis weight of the elastic component was measured in the same way once it was delaminated from the composite elastic material. After subjecting the sample to the stretch-to-stop (STS) test, (which is discussed in more detail below), the samples were soaked in isopropyl alcohol for approximately 3 to 5 minutes. The spunbond facings of the composite elastic material were then removed. The remaining elastic fibrous web was then placed in a standard laboratory hood, where it was allowed to dry for approximately 5 minutes. Once dried, the elastic fibrous web was weighed as described above. The "relaxed elastic basis weight" was determined by dividing the elastic web weight by the area of the original laminate. The "elastic basis weight", as reported in the tables below, was determined by the following:

Elastic basis weight=Relaxed elastic basis weight/((*STS*/100)+1)

Drape Stiffness

The "Drape Stiffness" test measures the drape stiffness or resistance to bending of the material. The bending length is a measure of the interaction between the material weight and stiffness as shown by the way in which the material bends under its own weight, in other words, by employing the principle of cantilever bending of the composite under its own weight. In general, the sample was slid at 4.75 inches per minute (12 cm/min), in a direction parallel to its long dimension, so that its leading edge projected from the edge of a horizontal surface. The length of the overhang was measured when the tip of the sample was depressed under its own weight to the point where the line joining the tip to the edge of the platform made a 41.5° angle with the horizontal. The longer the overhang, the slower the sample was to bend; thus, higher numbers indicate stiffer composites. This method conforms to specifications of ASTM Standard Test D 1388.

The test samples were prepared as follows. Samples were cut into rectangular strips measuring 1 inch (2.54 cm) wide and 6 inches (15.24 cm) long, unless otherwise noted. Three specimens of each sample were tested in the machine direction. A suitable Drape-Flex Stiffness Tester, such as FRL-Cantilever Bending Tester, Model 79-10 available from Testing Machines Inc., located in Amityville, N.Y., was used to perform the test.

The drape stiffness, measured in centimeters, is one-half of the length of the overhang of the specimen when it reaches the 41.50° slope. The drape stiffness of the samples as reported below was the arithmetic average of three (3) repetitions of the results obtained from the samples tested in the machine direction, reported separately.

Cup Crush

The softness of a material, as an indicator of "cloth-like" aesthetics, may be measured according to the "cup crush" test. The cup crush test evaluated fabric stiffness by measuring the peak load (also called the "cup crush load" or just "cup crush") required for a 4.5 cm diameter hemispherically shaped foot to crush a 23 cm by 23 cm piece of material shaped into an approximately 6.5 cm diameter by 6.5 cm tall inverted cup while the cup shaped fabric is surrounded by an approximately 6.5 cm diameter cylinder to maintain a uniform deformation of the cup shaped fabric. An average of 10 readings was used. The foot and the cup were aligned to avoid contact between the cup walls and the foot which could affect the readings. The peak load was measured while the foot was descending at a rate of about 0.25 inches per second (380 mm per minute) and was measured in grams. The cup crush test also yielded a value for the total energy required to crush a sample (the "cup crush energy") which was the energy from the start of the test to the peak load point, i.e. the area under the curve formed by the load in grams on one axis and the distance the foot travels in millimeters on the other. Cup crush energy was therefore reported in gm-mm. Lower cup crush values indicate a softer material. Cup crush was measured using a model FTD-G-500 load cell (500 gram range) available from the Schaevitz Company, Pennsauken, N.J.

Stress Elongation

Stress elongation of the comparative and inventive samples was measured on a Materials Testing System (MTS) Sintech 1/S tensile test frame available from Sintech Corp. of Cary, N.C. Standard laboratory conditions were maintained at a temperature of 23±2° C. (73.4±3.6° F.) and 50±5% relative humidity. Sample size was about 3 inches (7.62 cm) wide and 7 inches (17.78 cm) long. Each sample was clamped between the jaws of the grip at a 3-inch (7.62 cm) grip-to-grip distance. Each sample was then stretched at a cross-head displacement speed of 20 inches per minute (500 mm/min) until the sample broke. The load was measured in grams force and reported as "ultimate load/Elastic gsm" in the tables below which represents the load in grams force divided by the basis weight of the composite elastic material in gsm. Also, the "ultimate elongation" was measured as the increase in length expressed as a percentage of the original gage length. Likewise, the "load at intercept" was the load in grams where the elasticity of the material ended and the tensile strength of the sample took over.

Data from the Sintech 1/S system was reduced by calculating the engineering stress (pounds per square inch, or psi (also reported in SI equivalents in parenthesis)) from a knowledge of the initial cross-sectional area of each sample. Strain, or elongation, was calculated from the initial grip-to-grip distance and the constant elongation. The ratio of the stress and strain gives the elastic modulus (psi).

Stress Relaxation

The test as described above for stress elongation was modified as described below to determine the stress relaxation. This test has been designed to simulate use conditions, e.g. the wearing of a diaper. This time, however, each sample was stretched to a final constant elongation of 4.5 inches (11.43 cm) (50% elongation) at body temperature of approximately 100° F. (37.8° C.) for a period of 6 hours. Data from the Sintech 1/S system was reduced by calculating the engineering stress (pounds per square inch, or psi (also reported in SI equivalents in parenthesis)) from a knowledge of the initial cross-sectional area of each sample. Strain, or elongation, was calculated from the initial grip-to-grip distance and the constant elongation. The ratio of the stress and strain gives the elastic modulus (psi).

The resulting data can be fitted to the following power-law model to obtain the exponent, m:

$$\sigma = (\sigma_{t=0.1\ min.})(t^{-m}),$$

wherein σ is stress, t is time and m represents how fast the material loses its load, or elastic properties. Table 2 shows the rate of actual load loss, or slope, as calculated using the above-described formula.

Tension Set

Each sample was stretched initially 25% in the machine direction at a cross-head speed of 20 inches per minute (50.8 cm/min). The samples were then stretched 50%, 100%, 200% and 300% for a total of 5 cycles in a stepwise manner. Immediately after the completion of the test, the percentage set was calculated from the knowledge of the final and initial displacements for each cycle as "% set ", which is the measure of the irreversibility of the deformation.

$$\% \text{ set} = \frac{\text{final displacement} - \text{initial grip-to-grip distance}}{\text{initial grip-to-grip distance}} \times 100$$

Stretch-to-Stop Test

The term "stretch-to-stop or STS " as used herein refers to a ratio determined from the difference between the unextended dimension of a composite elastic material and the maximum extended dimension of a composite elastic material upon the application of a specified tensioning force and dividing that difference by the unextended dimension of the composite elastic material. If the stretch-to-stop is expressed in percent, this ratio is multiplied by 100. For example, a composite elastic material having an unextended length of 5 inches (12.7 cm) and a maximum extended length of 10 inches (25.4 cm) upon applying a force of 2000 grams has a stretch-to-stop (at 2000 grams) of 100 percent. Stretch-to-stop may also be referred to as "maximum non-destructive elongation". Unless specified otherwise, stretch-to-stop values are reported herein at a load of 2000 grams. In the elongation or stretch-to-stop test, a 3 inch by 7 inch (7.62 cm by 17.78 cm) sample, with the larger dimension being the machine direction, is placed in the jaws of the Sintech machine using a gap of 5 cm between the jaws. The sample is then pulled to a stop load of 2000 gms with a crosshead speed of about 20 inches/minute (50.8 cm/minute).

Cyclic Testing

Cyclic testing was performed using the Sintech 1/S computerized material testing system as described above. In the cyclic testing, a material was taken to a fixed extension corresponding to 100 percent of the elongation as described above for 10 cycles, and allowed to return to its original dimension, if it would do so. % Hysteresis was the energy lost from the extension to the retraction phases of each cycle. In other words, the % hysteresis was:

% hysteresis=100×(loading energy (extension)−unloading energy (retraction)) loading energy Scanning Electron Microscopy (SEM)

The samples were spattered with gold in a Balzers minicoater in the presence of argon at 0.1 mbar at 35 mA for 3 minutes at 135 volts to obtain a 300 A uniform coating. Pictures were taken using a Hitachi S-4500 Field Emission scanning electron microscope at an accelerating voltage of 3 kV, and a working distance of 22 mm and a magnification of 40×.

Optical Microscopy (OM)

The samples were stained with ruthenium tetroxide (RuO4) vapors to selectively stain the elastomeric continuous filaments. Digitally transmitted light images were acquired directly into the PGT imagist system from the M420 instrument. The number of broken filaments per unit area was determined using the feature numbering capability and dividing by the measured area. This approach prevented any need for sample preparation that might otherwise introduce filament breakage.

Examples 1–2 and Comparative Examples A–C

All of the samples of this test were made using an elastic continuous filament layer made of Kraton® G-2760 elastomeric (polystyrene/poly(ethylene-propylene)/polystyrene/poly(ethylene-propylene)) block copolymer having a diameter in the range of 0.020 to 0.030 inches (0.0508 to 0.0762 cm). The elastomeric meltblown fiber was meltblown onto the continuous filaments to make an elastic fibrous web having a basis weight as described below in Table 1, the elastomeric meltblown fiber also being made of Kraton® G-2760 elastomeric block copolymer. Additionally, a gatherable layer of 0.4 osy (13.6 gsm) white spunbond nonwoven web made of polypropylene available from Kimberly-Clark was attached to each side of the elastic fibrous web. The layers were laminated together with the total basis weight and bond pattern as described below in Table 1. For the composite elastic materials made using the pattern un-bonded (PUB) calender rollers of the present invention, Samples 1 and 2, the percent bonding area was 30% of the material, and the recessed areas of the rollers had a diameter of 0.130 inches (0.33 cm), with a depth (D) of 0.060 inches (0.15 cm). The draw ratio was 5× for each sample. In other words, referring to FIG. 1, the surface speed of elastic fibrous web 130 as it passes between the nip of pinch rollers 132 and 134 is less than the surface speed as the web passes between the nip of PUB rollers 36 and 38. As an example, if the surface speed of the nip between pinch rollers 132 and 134 is 10 fpm (3.05 m/min.), and the surface speed of the nip between PUB rollers 36 and 38 is 50 fpm (15.24 m/min.), then the draw ratio is 5 (50 fpm divided by 10 fpm), meaning that the elastic fibrous web was stretched 400%.

Samples 1 and 2 below were made according to the present invention. Sample 2 differed from Sample 1 in that it was made using a bonding pressure higher than that of Sample 1—sufficiently high that it began to affect the material properties. Comparative Sample C was a material which has been smooth roll calendered at the stated conditions according to the prior art. Comparative Samples A and B were materials which have been patterned roll calendered at the stated conditions according to the prior art. Turning to Table 1, stretch-to-stop has been measured for the various samples. For the stretch-to-stop test, a value of ~400% is approximately the maximum achievable value, because this represents the amount the elastic fibrous web is stretched during the lamination process. In the patterned roll samples, Comparative Samples A and B, STS values of 219 and 200% respectively, were found. When the same type of sample was smooth roll calendered, Comparative Sample C, STS decreased to 170%. When the samples of the present invention were tested, STS values of 210 and 198% were found, so the previously achievable values (from the patterned roll calendering) were regained.

Furthermore, the ultimate load per weight of elastic material was actually improved in the materials of the present invention. Again, for the Comparative Samples A and B, strength values of 29.80 and 24.00 g/gsm were measured. When the same samples were smooth roll calendered, Comparative Sample C, a marked improvement in strength was found of 36.90 g/gsm, due mostly to the fact that the continuous filament layer was not broken or damaged as is done in patterned roll calendering. For the samples of the present invention, a surprising improvement over the patterned and smooth roll calendered samples was found at 38.70 g/gsm (which should be compared to the samples calendered at 25 psi) and 35.70 g/gsm respectively.

TABLE 1

Physical Properties

| Sample | Bond Pattern | Bond Gage Pressure - psi (MPa) | Bond Area - % | Laminate Basis Weight - gsm | Elastic Basis Weight - gsm | STS - % | LAI[1]/ Elastic gsm - $g_f$/gsm | Ultimate Elongation - % | Ultimate Load/ Elastic gsm - $g_f$/gsm | Elastic Modulus - psi (MPa) |
|---|---|---|---|---|---|---|---|---|---|---|
| A | Lg. Diam. Raised Pin | 25 (0.17) | 12 | 279 | 56.4 | 219 | 8.24 | 375 | 29.80 | 33 (0.23) |
| B | Lg. Diam. Raised Pin | 40 (0.28) | 12 | 289 | 62 | 200 | 6.77 | 322 | 24.00 | 32 (0.22) |
| S | Smooth | 25 (0.17) | 100 | 220 | 51.5 | 170 | 6.87 | 324 | 36.90 | 37 (0.26) |
| 1 | PUB | 25 (0.17) | 30 | 254 | 51 | 210 | 7.79 | 381 | 38.70 | 30 (0.21) |
| 2 | PUB | 40 (0.28) | 30 | 251 | 53.4 | 198 | 8.08 | 324 | 35.70 | 33 (0.23) |

[1]Load at Intercept

In Table 2 below, dimensional stability in the form of stress relaxation was tested for the samples described above according to the test method described above. The test was conducted for a period of 6 hours at temperatures near to body temperature (100° F. (37.8° C.)). Small changes in slope are significant because the slope is not linear for these elastic materials. For Sample 2, the material which had been subjected to the higher bonding pressure, the stress relaxation was not good. For this reason, it is believed that excessive bonding pressures can adversely affect the composite elastic materials according to the present invention. As compared to Comparative Sample B, it is clear that the higher bonding pressure in the patterned roll bonding did not similarly adversely affect the composite elastic material.

As for the samples made using the 25 psi (0.17 Mpa) bond pressure, it can be seen that for materials made using patterned roll calendering (Comparative Sample A), the load loss is high at 58%. The material made using smooth roll calendering (Comparative Sample C), clearly improved load loss over Comparative Sample A to 49%. For the sample made according to the present invention, Sample 1, load loss is comparable to Comparative Sample C at 51%, and clearly an improvement over Comparative Sample A. For samples made according to the present invention, therefore, dimensional stability has not been compromised over the smooth roll calendered materials and shows definite improvement over patterned roll calendered materials.

TABLE 2

Stress Relaxation

| Sample | Slope (m) | % Load Loss |
|---|---|---|
| A | −0.109 | 58 |
| B | −0.103 | 59 |
| C | −0.086 | 49 |
| 1 | −0.093 | 51 |
| 2 | −0.142 | 69 |

In Table 3 below, the data resulting from testing the "cloth-like" aesthetics of the +material of the present invention, in comparison with the comparative examples, is represented. Sample 2 and Comparative Sample B, the materials which were bonded using the higher bonding pressure, were not tested (N/T) for these properties because the stress relaxation properties from Table 2 above indicate that for Comparative Sample B, the cup crush and drape stiffness behavior would be similar to Comparative Sample A. Further, the stress relaxation properties for Sample 2 did not indicate that attractive cup crush and drape stiffness values would be achieved. For cup crush and stiffness, the lower the value, the more soft and "cloth-like" the sample.

For the example of the present invention, Sample 1, improvements in both cup crush energy and drape stiffness were found as compared to Comparative Samples A and C, meaning that the material exhibited improvements in "cloth-like" qualities.

TABLE 3

Cup Crush and Drape Stiffness

| Sample | Cup Crush Load ($g_f$) | Cup Crush Energy ($g_f$/mm) | Drape Stiffness MD (cm) |
|---|---|---|---|
| A | 225 | 2270 | 2.59 |
| B | N/T | N/T | N/T |
| C | 239 | 2803 | 2.60 |
| 1 | 225 | 2242 | 2.44 |
| 2 | N/T | N/T | N/T |

In Tables 4 and 5 below, the samples were subjected to the tension set and hysteresis tests. This data shows that for these materials, neither tension set nor hysteresis have been negatively impacted by the process of the present invention.

TABLE 4

Percent Tension Set values at the designated percent elongation at body temperature

| Sample | 25% | 50% | 100% | 150% | 200% |
|---|---|---|---|---|---|
| A | 1 | 2 | 6 | 9 | 14 |
| B | 1 | 2 | 5 | 10 | 14 |
| C | 1 | 3 | 7 | 13 | 21 |
| 1 | 1 | 2 | 5 | 10 | 15 |
| 2 | 1 | 3 | 5 | 10 | 17 |

TABLE 5

Percent Hysteresis values per cycle - at body temperature and 100% elongation

| Sample | Cycle 1 | 2 | 3 | 4 | 5 | 6 | 7 | 8 | 9 | 10 |
|---|---|---|---|---|---|---|---|---|---|---|
| A | 29 | 16 | 15 | 14 | 14 | 14 | 13 | 13 | 13 | 13 |
| B | 30 | 16 | 15 | 14 | 14 | 14 | 14 | 14 | 14 | 14 |
| C | 29 | 17 | 16 | 15 | 15 | 15 | 15 | 14 | 14 | 14 |
| 1 | 28 | 16 | 15 | 14 | 14 | 14 | 14 | 13 | 13 | 13 |
| 2 | 29 | 17 | 16 | 15 | 15 | 14 | 14 | 14 | 14 | 14 |

In Table 6 below, inherent latency has been measured in the machine direction (MD) as a function of percent shrinkage. Each of the samples was tested similarly in the cross-machine direction (CD), but since no significant shrinkage was found, the data has not been reproduced below. To determine the percent shrinkage, the materials were allowed to age for a period of approximately 2 to 3 days until the samples were essentially flat. The relaxed material was then cut into 3 by 7 inch (7.62 by 17.78 cm) samples. The samples were then placed flat into a vacuum oven having a temperature of approximately 71° C. (159.8° F.) for a period of 30 seconds. The final length was measured and percent shrinkage was calculated as shown in the Table below. Each of the values below represents the average value for 5 specimens per sample.

As can be seen from the data, the inherent latency of the sample of the present invention, Sample 1, has essentially returned to that of the patterned roll calendered sample, Comparative Sample A. Accordingly, the inherent latency has returned to a more controllable level. Furthermore, to adjust inherent latency, if more is desired, one would simply increase the bonded area to achieve the desired level.

TABLE 6

Inherent Latency

| Sample | Initial Length in. (cm) | Final Length in. (cm) | Shrinkage in. (cm) | % Shrinkage (MD) |
|---|---|---|---|---|
| A | 7 (17.78) | 6.86 (17.42) | 0.14 (0.36) | 2.01 |
| C | 7 (17.78) | 6.63 (16.84) | 0.38 (0.97) | 5.67 |
| 1 | 7 (17.78) | 6.86 (17.42) | 0.14 (0.36) | 2.01 |

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

We claim:

1. A composite elastic material with improved aesthetics, dimensional stability and inherent latency, wherein said material exhibits an inherent latency of less than about 5.5%, and wherein said composite elastic material has on its surface a continuous bonded area defining a plurality of discrete unbonded areas, and further wherein said material is obtained by:
 a) providing an elastic fibrous web including filaments and fibers;
 b) providing at least one gatherable layer; and
 c) bonding said elastic fibrous web to said at least one gatherable layer to form a composite elastic material wherein said bonding occurs by passing the composite elastic material into a nip formed between an anvil calender roller and a point un-bonded calender roller, wherein said point un-bonded calender roller has recessed areas in the surface of said roller.

2. The material of claim 1 wherein said filaments and fibers of said elastic fibrous web are formed from at least one elastomeric polymer resin.

3. The material of claim 2 wherein said elastomeric polymer resin is selected from elastomeric polymer resins comprising metallocene polymers and elastomeric block copolymers having at least one elastic segment.

4. The material of claim 3 wherein said elastomeric block copolymers are selected from elastomeric block copolymers comprising polyurethanes, copolyether esters, polyamide polyether block copolymers, ethylene vinyl acetates (EVA), and block copolymers having the general formula A-B-A', A-B or A-B-A-B.

5. A creep resistant pattern un-bonded composite elastic material with improved aesthetics and softness comprising:
 a) an elastomeric continuous filament;
 b) an elastomeric meltblown fiber attached to said elastomeric continuous filament layer to form an elastic fibrous web; and
 c) at least one gatherable layer attached to said elastic fibrous web to form a composite elastic material;
 wherein said composite elastic material has on its surface a pattern of continuous bonded area defining a plurality of discrete unbonded areas formed by application of pressure such that said bond area covers at least about 15 to about 80% of the surface of said composite elastic material.

6. The composite elastic material of claim 5 wherein said bond area covers at least about 20 to about 60% of the surface of said composite elastic material.

7. The composite elastic material of claim 6 wherein said filaments and fibers of said elastomeric fibrous web are formed from at least one elastomeric polymer resin.

8. The composite elastic material of claim 7 wherein said elastomeric polymer resin is selected from elastomeric polymer resins comprising metallocene polymers and elastomeric block copolymers having at least one elastic segment.

9. The composite elastic material of claim 8 wherein said elastomeric block copolymers are selected from elastomeric block copolymers comprising polyurethanes, copolyether esters, polyamide polyether block copolymers, ethylene vinyl acetates (EVA), block copolymers having the general formula A-B-A', A-B or A-B-A-B.

10. The composite elastic material of claim 9 wherein said elastomeric block copolymers comprises a block copolymers having the general formula A-B-A-B.

11. The composite elastic material of claim 10 wherein said material exhibits an inherent latency of less than about 5.5%.

* * * * *

UNITED STATES PATENT AND TRADEMARK OFFICE
CERTIFICATE OF CORRECTION

PATENT NO. : 6,387,471 B1
DATED : May 14, 2002
INVENTOR(S) : Jack Taylor et al.

It is certified that error appears in the above-identified patent and that said Letters Patent is hereby corrected as shown below:

Title page,
Item [63], the Related U.S. Application Data, is missing from the patent. Add
-- Related U.S. Application Data -- Provisional application No. 60/127,608, filed on March 31, 1999. --

Column 6,
Line 63, "KRATONE®" should read -- KRATON® --

Column 9,
Line 14, "Meltbiowing" should read -- Meltblowing --

Column 14,
Line 39, "pattem" should read -- pattern --
Line 57, "meltbiown" should read -- meltblown --

Column 18,
Lines 9-10, "to difficult process" should read -- difficult to process --

Signed and Sealed this

Twenty-first Day of October, 2003

JAMES E. ROGAN
*Director of the United States Patent and Trademark Office*